(12) United States Patent
Xu et al.

(10) Patent No.: US 11,464,000 B2
(45) Date of Patent: Oct. 4, 2022

(54) INFORMATION INDICATION METHOD, TERMINAL DEVICE, AND NETWORK DEVICE

(71) Applicant: HUAWEI TECHNOLOGIES CO., LTD., Shenzhen (CN)

(72) Inventors: Xiaoying Xu, Shanghai (CN); Qinghai Zeng, Shanghai (CN); Qufang Huang, Shanghai (CN); Chunhua You, Shanghai (CN); Jun Chen, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 134 days.

(21) Appl. No.: 16/910,611

(22) Filed: Jun. 24, 2020

(65) Prior Publication Data
US 2020/0322937 A1     Oct. 8, 2020

Related U.S. Application Data

(63) Continuation of application No. PCT/CN2018/122952, filed on Dec. 22, 2018.

(30) Foreign Application Priority Data

Dec. 29, 2017   (CN) .......................... 201711468334.1

(51) Int. Cl.
*H04W 72/04*      (2009.01)
*H04L 5/00*       (2006.01)
*H04W 72/12*      (2009.01)

(52) U.S. Cl.
CPC ......... *H04W 72/042* (2013.01); *H04L 5/0094* (2013.01); *H04W 72/0413* (2013.01);
(Continued)

(58) Field of Classification Search
CPC .......... H04W 72/042; H04W 72/0413; H04W 72/0446; H04W 72/1284; H04W 72/1289; H04L 5/0094
(Continued)

(56) References Cited

U.S. PATENT DOCUMENTS 11,252,762 B2*  2/2022  Dinan .................. H04W 52/248
2016/0119098 A1*  4/2016  Oishi ..................... H04L 5/0048
                                                                 370/329
(Continued)

FOREIGN PATENT DOCUMENTS

CN       102821477 A       12/2012
CN       105101435 A       11/2015
(Continued)

OTHER PUBLICATIONS

3GPP TS 22.261 V16.1.0 (Sep. 2017),3rd Generation Partnership Project Technical Specification Group Services and System Aspects;Service requirements for the 5G system;Stage 1 (Release 16), total 52 pages.

(Continued)

*Primary Examiner* — Peter G Solinsky
(74) *Attorney, Agent, or Firm* — Rimon PC

(57) ABSTRACT

This application discloses an information indication method and a related terminal device and network device. The method includes determining, by a terminal device, time domain requirement information of data transmission. The time domain requirement information includes at least one of time adjustment information, jitter time information, time domain resource information, latest sending time information, and remaining duration of the data transmission. The method further comprises sending, by the terminal device, the time domain requirement information to a network device.

23 Claims, 11 Drawing Sheets

(52) U.S. Cl.
CPC ... *H04W 72/0446* (2013.01); *H04W 72/1284* (2013.01); *H04W 72/1289* (2013.01)

(58) Field of Classification Search
USPC .......................................................... 370/329
See application file for complete search history.

(56) References Cited

U.S. PATENT DOCUMENTS

| | | | |
|---|---|---|---|
| 2016/0302128 A1 | 10/2016 | Anchan et al. | |
| 2017/0078997 A1* | 3/2017 | Dinan | H04W 16/14 |
| 2019/0149305 A1* | 5/2019 | Zhou | H04L 5/0055 |
| | | | 370/330 |

FOREIGN PATENT DOCUMENTS

| | | | | |
|---|---|---|---|---|
| CN | 106060947 A | 10/2016 | | |
| CN | 106793135 A | 5/2017 | | |
| CN | 107155218 A | 9/2017 | | |
| CN | 107205279 A | 9/2017 | | |
| WO | 2008043259 A1 | 4/2008 | | |
| WO | WO-2018189726 A1 * | 10/2018 | | H04L 45/38 |

OTHER PUBLICATIONS

LG Electronics, Discussion on carrier aggregation and bandwidth parts. 3GPP TSG RAN WG1 Meeting NR#3, Nagoya, Japan, Sep. 18, 2017, R1-1715892, 12 pages.

Huawei, HiSilicon, On bandwidth adaptation. 3GPP TSG RAN WG1 NR Ad-Hoc Meeting, Qingdao, China, Jun. 27, 2017, R1-1711424, 5 pages.

* cited by examiner

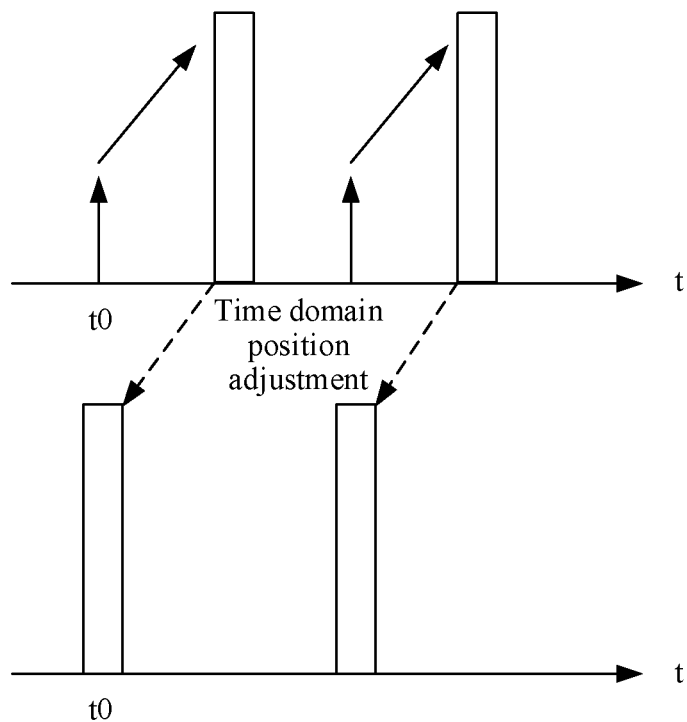

FIG. 2b

| A terminal device determines time domain requirement information of data transmission, where the time domain requirement information includes at least one of time adjustment information, jitter time information, time domain resource information, latest sending time information, and remaining duration of the data transmission | ⟵ 301 |

↓

| The terminal device sends the time domain requirement information to a network device | ⟵ 302 |

FIG. 3

INFORMATION INDICATION METHOD, TERMINAL DEVICE, AND NETWORK DEVICE

CROSS-REFERENCE TO RELATED APPLICATIONS

This application is a continuation of International Application No. PCT/CN2018/122952, filed on Dec. 22, 2018, which claims priority to Chinese Patent Application No. 201711468334.1, filed on Dec. 29, 2017. The disclosures of the aforementioned applications are hereby incorporated by reference in their entireties.

TECHNICAL FIELD

This application relates to the field of communications technologies, and in particular, to an information indication method, a terminal device, and a network device.

BACKGROUND

With continuous development of communications technologies, more communication processes may be implemented in a wireless communication manner. For example, for industrial control, a control console can send an instruction to a machine device over a wireless network, to control the device to perform communication processes such as performing an action, detecting a status, and reporting status information to a server. Generally, transmission periods of services generated in an industrial control process are fixed, and content of a generated instruction or a size of reported information is relatively stable. These services have a relatively high requirement on transmission reliability and a latency. This type of services generated in the industrial control process are commonly referred to as services with a deterministic transmission requirement. In addition, currently, for periodic service transmission, for example, voice transmission, the prior art supports periodical pre-allocation of an uplink grant resource for sending uplink data. In other words, a network side configures a use period and an uplink grant of a resource and sends the use period and the uplink grant of the resource to a terminal, so that the terminal can periodically use the resource.

However, during data transmission, a configured periodic resource usually does not match a moment at which the resource is required in service transmission, resulting in a transmission delay. For some services, for example, the industrial control services with a deterministic transmission requirement, if a transmission delay is caused because a configured periodic resource does not match a moment at which the resource is required in service transmission, a transmission requirement of the services cannot be met.

SUMMARY

Embodiments of the present invention provide an information indication method, a terminal device, and a network device, to help reduce a data transmission delay and improve data transmission reliability.

According to one aspect, an embodiment of the present invention provides an information indication method, including: determining, by a terminal device, time domain requirement information of data transmission, where the time domain requirement information may be used to instruct a network device to allocate a resource for transmitting the data. Further, the terminal device may further send the time domain requirement information to the network device. The time domain requirement information may include at least one of time adjustment information, jitter time information, time domain resource information, latest sending time information, and remaining duration of the data transmission. The time adjustment information may be used to indicate allocation of a resource for the data transmission, the jitter time information may be used to indicate a time range in which the data is generated, the time domain resource information may be used to indicate a sending time of the data, and the latest sending time information and/or the remaining duration may be used to indicate a latest sending time of the data. This helps reduce a data transmission delay, and improve data transmission reliability.

In a possible design, the allocation may include adjustment of an allocated resource for the data, the time domain requirement information further includes channel information, and the channel information is used to indicate a channel associated with the allocated resource. The channel associated with the resource may be a data transmission channel corresponding to the resource, that is, a channel on which the terminal device transmits the data by using the allocated resource. In this case, by indicating, to the network device, the channel associated with the allocated resource for the data, the terminal device can improve efficiency of determining a resource position that needs to be adjusted.

In a possible design, the allocation includes adjustment of an allocated resource for the data, the allocated resource includes at least one group of resources, the time domain requirement information further includes a resource identifier, and the resource identifier is used to indicate a resource, in the at least one group of resources, whose resource position needs to be adjusted. The at least one group of resources may be frequency domain resources. In this case, the terminal device may further indicate, to the network device, resource identifiers of the one or more groups of resources, that is, identifiers of resources whose resource positions need to be adjusted, so that the network device performs resource adjustment on the resources corresponding to the resource identifiers. This reduces power consumption of the device, and improves accuracy of determining allocated resources for resource position adjustment.

In a possible design, the sending, by the terminal device, the time domain requirement information to a network device may be specifically: sending, by the terminal device, the time domain requirement information to the network device when a difference between a generation time of the data and a time of an allocated resource that can be used to send the data after the data is generated exceeds a preset threshold. The allocated resource that may be used to send the data after the data is generated may be a next available resource or an adjacent available resource after the data is generated. In other words, before sending the time domain requirement information to the network device, the terminal device may further detect whether the difference between the generation time of the data and the time of the allocated resource that can be used to send the data after the data is generated exceeds the preset threshold. When the difference exceeds the preset threshold, the terminal device is triggered to send the time domain requirement information to the network device. In this way, the network device can be instructed to adjust a resource when a delay is relatively high, thereby reducing the power consumption of the device.

In a possible design, the time domain requirement information includes the time adjustment information; and the terminal device may further receive an acknowledgment message sent by the network device, and may transmit the data by using the resource indicated by the time adjustment information. In other words, after the terminal device sends the time domain requirement information to the network device, if the terminal device receives the acknowledgment message returned by the network device, the terminal device can use the resource indicated by the time adjustment information as a new allocated resource after the adjustment, and can perform data transmission by using the resource indicated by the time adjustment information. This improves resource allocation efficiency.

In a possible design, the terminal device may further obtain frequency domain requirement information for the data transmission, and may send the frequency domain requirement information to the network device, so that the network device can allocate a resource for transmitting the data, to the terminal device with reference to the frequency domain requirement information.

In a possible design, the time domain requirement information and/or the frequency domain requirement information may be carried in physical layer signaling such as physical layer uplink control information, or may be carried in media access control (media access control, MAC for short) layer signaling such as MAC control element (CE for short) information, or carried in higher layer signaling such as a radio resource control (RRC for short) message. Alternatively, optionally, the time domain requirement information and/or the frequency domain requirement information may be reported in a user plane, for example, carried in a protocol subheader (a header of a data packet). For example, a transmission time requirement of the data packet may be indicated in a service data adaptation protocol (SDAP for short) subheader, a packet data convergence protocol (PDCP for short) subheader, a radio link control (RLC for short) subheader, or a MAC subheader. A manner of reporting the time domain requirement information and/or the frequency domain requirement information is not limited in this application.

In a possible design, the terminal device may further receive information that is about the resource for the data transmission and that is sent by the network device, for example, information about the foregoing allocated resource, and may determine the resource for the data transmission, for example, the allocated resource, based on the information about the resource for the data transmission. Further, the terminal device may further receive timer information sent by the network device, and may determine a timer value based on the timer information. Further, the terminal device may start a timer when a timer start condition is met, and prohibit using the resource for the data transmission to send data within a duration range corresponding to the timer value. In this case, flexibility of data transmission or scheduling can be improved.

In a possible design, the timer information may include one or more of: information used to indicate one or more timer values, a quantity of repetition times of a pre-allocated resource, that is, the allocated resource, a period of the allocated resource, and the like.

In a possible design, the information about the resource and/or the timer information may be sent by using higher layer signaling, or may be sent by using physical layer signaling. This is not limited in this application.

In a possible design, the timer start condition may be any one or more of the following: the terminal device sends uplink data on the allocated resource in a hybrid automatic repeat request (HARQ for short) process; the terminal device receives grant resource indication information sent by the network device, where the grant resource indication information indicates a grant resource, the grant resource is associated with an HARQ process, and the terminal device sends uplink data on the grant resource indicated by the grant resource indication information; the terminal device receives a dedicated preamble sequence index sent by the network device; and the terminal device receives a dedicated preamble sequence index sent by the network device, and sends a dedicated preamble sequence to the network device based on the preamble sequence index.

In a possible design, the terminal device may further receive an HARQ process identifier, or receive an activation or deactivation instruction for the allocated resource. The terminal device may stop the timer after receiving a scheduling grant of an HARQ process indicated by the HARQ process identifier, or receiving the activation or deactivation instruction for the allocated resource; or may stop the timer when the timer expires, that is, after duration corresponding to the timer value expires.

In a possible design, the timer information may include different air interface formats and timer values corresponding to the air interface formats. In this case, the terminal device can determine a value of a used timer based on an air interface format of an uplink resource (that is, a resource sent in uplink, for example, the allocated resource) or an air interface format used during downlink scheduling associated with an uplink resource.

In a possible design, the timer information may include a value, and the value may be used as a reference value in different air interface formats. In this case, the terminal device can determine a value of a used timer based on an air interface format of an uplink resource (or an air interface format used during downlink scheduling associated with an uplink resource) and the value included in the timer information.

In a possible design, the timer information may include information about different bandwith parts (BWP for short) and timer values corresponding to the BWPs. In this case, the terminal device can determine a value of a used timer based on a BWP of an uplink resource or a BWP of downlink scheduling associated with an uplink resource.

In a possible design, the timer information may include different air interface formats and different values corresponding to the air interface formats. In this case, the terminal device can determine a value of a used timer based on an air interface format of an uplink resource (or an air interface format used during downlink scheduling associated with an uplink resource) and the value corresponding to the air interface format that is included in the timer information.

In a possible design, the timer information may include different BWPs and different values corresponding to the BWPs. In this case, the terminal device determines, based on a BWP to which an uplink resource belongs (or a BWP to which downlink scheduling associated with an uplink resource belongs), an air interface format corresponding to the BWP, and further determines a value of a used timer based on a value corresponding to the BWP that is included in the timer information and an air interface format corresponding to the BWP.

In a possible design, the timer information may include a value. The terminal device may determine a value of a used timer based on a period of the used allocated resource and the value included in the timer information.

In a possible design, when downlink scheduling associated with an uplink resource has a plurality of air interface formats or a plurality of BWPs, the terminal device may determine a plurality of timer values based on the plurality of air interface formats or the plurality of BWPs respectively; and may choose to use a largest timer value or a smallest timer value in the plurality of timer values, or may choose to use an average value or the like of the plurality of timer values. This is not limited in this application.

In a possible design, the terminal device may choose to use a largest timer value in the plurality of timer values, to avoid missing a possible uplink scheduling occasion in a network, thereby improving scheduling reliability.

In a possible design, the timer information may alternatively be information used to indicate a type of a timer, and indicates a downlink BWP implicit deactivation timer, a cell implicit deactivation timer, a discontinuous reception-inactivity timer such as drx-InactivityTimer, and the like. In this case, the terminal device may determine a corresponding timer based on the timer information, to start or restart the timer and ensure normal data transmission.

According to another aspect, an embodiment of the present invention further provides an information indication method, including: obtaining, by a network device, time domain requirement information of data transmission performed by a terminal device, and allocating, by the network device, a resource for transmitting the data, to the terminal device based on the time domain requirement information. The time domain requirement information may include at least one of time adjustment information, jitter time information, time domain resource information, latest sending time information, and remaining duration of the data transmission. The time adjustment information may be used to indicate allocation of a resource for the data transmission, the jitter time information may be used to indicate a time range in which the data is generated, the time domain resource information may be used to indicate a sending time of the data, and the latest sending time information and/or the remaining duration may be used to indicate a latest sending time of the data. This helps reduce a data transmission delay, and improve data transmission reliability.

In a possible design, the allocation includes allocating a new resource to the terminal device, or adjusting an allocated resource of the terminal device.

In a possible design, the obtaining, by a network device, time domain requirement information of data transmission performed by a terminal device may be specifically: receiving, by the network device, the time domain requirement information sent by the terminal device.

In a possible design, the obtaining, by a network device, time domain requirement information of data transmission performed by a terminal device may be specifically: obtaining, by the network device from a core network entity or a network management system, the time domain requirement information of the data transmission performed by the terminal device.

In a possible design, the allocating, by the network device, a resource for transmitting the data, to the terminal device based on the time domain requirement information may be specifically: allocating, by the network device, a resource group for transmitting the data, to the terminal device based on the time domain requirement information, where the resource group includes at least three resources, and interval time lengths of the at least three resources are different.

In a possible design, interval time lengths of any two adjacent resources in the at least three resources are different, and the closer to the latest sending time of the data, the shorter an interval time length of adjacent resources in the at least three resources is.

In a possible design, the time domain requirement information includes the time adjustment information; and the allocating, by the network device, a resource for transmitting the data, to the terminal device based on the time domain requirement information may be specifically: sending, by the network device, an acknowledgment message to the terminal device for the time adjustment information, where the acknowledgment message is used to instruct the terminal device to transmit the data by using the resource indicated by the time adjustment information. In other words, after receiving the time adjustment information sent by the terminal device, the network device may use the resource indicated by the time adjustment information as the adjusted resource allocated to the terminal device; and may send the acknowledgment message to the terminal device, to instruct the terminal device to transmit the data by using the resource indicated by the time adjustment information, thereby completing the allocation of the resource for transmitting the data by the terminal device.

In a possible design, the allocation may include adjustment of an allocated resource for the data, the time domain requirement information further includes channel information, and the channel information is used to indicate a channel associated with the allocated resource. The channel associated with the resource may be a data transmission channel corresponding to the resource, that is, a channel on which the terminal device transmits the data by using the allocated resource. In this case, the network device can quickly obtain the information about the allocated resource based on the channel information, thereby improving efficiency of determining a resource position that needs to be adjusted.

In a possible design, the allocation includes adjustment of an allocated resource for the data, the allocated resource includes at least one group of resources, the time domain requirement information further includes a resource identifier, and the resource identifier is used to indicate a resource, in the at least one group of resources, whose resource position needs to be adjusted. The at least one group of resources may be frequency domain resources. In this case, the network device can perform resource adjustment on the resource corresponding to the resource identifier indicated by the terminal device, thereby reducing power consumption of the device and improving accuracy of determining the allocated resource for resource position adjustment.

In a possible design, the network device may further receive frequency domain requirement information sent by the terminal device, so that the network device can allocate a resource for transmitting the data, to the terminal device with reference to the frequency domain requirement information. This further improves resource allocation reliability.

In a possible design, the network device may further send, to the terminal device, information about the resource for the data transmission, for example, information about the foregoing allocated resource, so that the terminal device can determine the resource for the data transmission, for example, the allocated resource, based on the information about the resource for the data transmission. Further, the network device further sends timer information to the terminal device. In this way, the terminal device may determine a timer value based on the timer information; and start a timer when a timer start condition is met, and prohibit using the resource for the data transmission to send data within a duration range corresponding to the timer value. In this case, flexibility of data transmission or scheduling can be improved.

In a possible design, the timer information may include one or more of: information used to indicate one or more timer values, a quantity of repetition times of a pre-allocated resource, that is, the allocated resource, a period of the allocated resource, and the like.

In a possible design, the information about the resource and/or the timer information may be sent by using higher layer signaling, or may be sent by using physical layer signaling. This is not limited in this application.

In a possible design, the timer information may include different air interface formats and timer values corresponding to the air interface formats.

In a possible design, the timer information may include a value. Optionally, the value may be used as a reference value in different air interface formats, or may indicate a value of a timer in the period of the allocated resource.

In a possible design, the timer information may include information about different BWPs and timer values corresponding to the BWPs.

In a possible design, the timer information may include different air interface formats and different values corresponding to the air interface formats.

In a possible design, the timer information may include different BWPs and different values corresponding to the BWPs.

In a possible design, the timer information may alternatively be information used to indicate a type of a timer, and indicates a downlink BWP implicit deactivation timer, a cell implicit deactivation timer, a discontinuous reception-inactivity timer such as drx-InactivityTimer, and the like. In this case, the terminal device may determine a corresponding timer based on the timer information, to start or restart the timer and ensure normal data transmission.

According to still another aspect, an embodiment of the present invention further provides an information indication method, including: A terminal device receives information that is about a resource for data transmission and that is sent by a network device, and determines the resource for the data transmission, based on the information about the resource for the data transmission. The terminal device may further receive timer information sent by the network device, and may determine a timer value based on the timer information. Further, the terminal device may start a timer when a timer start condition is met, and prohibit using the resource for the data transmission to send data within a duration range corresponding to the timer value. In this case, flexibility of data transmission or scheduling can be improved.

In a possible design, the timer information may include one or more of: information used to indicate one or more timer values, a quantity of repetition times of a pre-allocated resource, that is, the allocated resource, a period of the allocated resource, and the like.

In a possible design, the information about the resource and/or the timer information may be sent by using higher layer signaling, or may be sent by using physical layer signaling. This is not limited in this application.

In a possible design, the timer start condition may be any one or more of the following: the terminal device sends uplink data on the allocated resource in an HARQ process; the terminal device receives grant resource indication information sent by the network device, where the grant resource indication information indicates a grant resource, the grant resource is associated with an HARQ process, and the terminal device sends uplink data on the grant resource indicated by the grant resource indication information; the terminal device receives a dedicated preamble sequence index sent by the network device; and the terminal device receives a dedicated preamble sequence index sent by the network device, and sends a dedicated preamble sequence to the network device based on the preamble sequence index.

In a possible design, the terminal device may further receive an HARQ process identifier, or receive an activation or deactivation instruction for the allocated resource. The terminal device may stop the timer after receiving a scheduling grant of an HARQ process indicated by the HARQ process identifier, or receiving the activation or deactivation instruction for the allocated resource; or may stop the timer when the timer expires, that is, after duration corresponding to the timer value expires.

In a possible design, the timer information may include different air interface formats and timer values corresponding to the air interface formats. In this case, the terminal device can determine a value of a used timer based on an air interface format of an uplink resource (that is, a resource sent in uplink, for example, the allocated resource) or an air interface format used during downlink scheduling associated with an uplink resource.

In a possible design, the timer information may include a value, and the value may be used as a reference value in different air interface formats. In this case, the terminal device can determine a value of a used timer based on an air interface format of an uplink resource (or an air interface format used during downlink scheduling associated with an uplink resource) and the value included in the timer information.

In a possible design, the timer information may include information about different BWPs and timer values corresponding to the BWPs. In this case, the terminal device can determine a value of a used timer based on a BWP of an uplink resource or a BWP of downlink scheduling associated with an uplink resource.

In a possible design, the timer information may include different air interface formats and different values corresponding to the air interface formats. In this case, the terminal device can determine a value of a used timer based on an air interface format of an uplink resource (or an air interface format used during downlink scheduling associated with an uplink resource) and the value corresponding to the air interface format that is included in the timer information.

In a possible design, the timer information may include different BWPs and different values corresponding to the BWPs. In this case, the terminal device determines, based on a BWP to which an uplink resource belongs (or a BWP to which downlink scheduling associated with an uplink resource belongs), an air interface format corresponding to the BWP, and further determines a value of a used timer based on a value corresponding to the BWP that is included in the timer information and an air interface format corresponding to the BWP.

In a possible design, the timer information may include a value. In this case, the terminal device may determine a value of a used timer based on a period of the used allocated resource and the value included in the timer information.

In a possible design, when downlink scheduling associated with an uplink resource has a plurality of air interface formats or a plurality of BWPs, the terminal device may determine a plurality of timer values based on the plurality of air interface formats or the plurality of BWPs respectively; and may choose to use a largest timer value or a smallest timer value in the plurality of timer values, or may choose to use an average value or the like of the plurality of timer values. This is not limited in this application.

In a possible design, the terminal device may choose to use a largest timer value in the plurality of timer values, to avoid missing a possible uplink scheduling occasion in a network, thereby improving scheduling reliability.

According to still another aspect, an embodiment of the present invention further provides an information indication method, including: A network device sends, to a terminal device, information about a resource for data transmission, and the network device further sends timer information to the terminal device. Therefore, the terminal device can determine the resource for the data transmission based on the information about the resource for the data transmission; determine a timer value based on the timer information; and start a timer when a timer start condition is met, and prohibit using the resource for the data transmission to send data within a duration range corresponding to the timer value. In this case, flexibility of data transmission or scheduling can be improved.

In a possible design, the timer information may include one or more of: information used to indicate one or more timer values, a quantity of repetition times of a pre-allocated resource, that is, the allocated resource, a period of the allocated resource, and the like.

In a possible design, the information about the resource and/or the timer information may be sent by using higher layer signaling, or may be sent by using physical layer signaling. This is not limited in this application.

In a possible design, the timer information may include different air interface formats and timer values corresponding to the air interface formats.

In a possible design, the timer information may include a value. Optionally, the value may be used as a reference value in different air interface formats, or may indicate a value of a timer in the period of the allocated resource.

In a possible design, the timer information may include information about different BWPs and timer values corresponding to the BWPs.

In a possible design, the timer information may include different air interface formats and different values corresponding to the air interface formats.

In a possible design, the timer information may include different BWPs and different values corresponding to the BWPs.

According to still another aspect, an embodiment of the present invention further provides an information indication method, including: sending, by a network device, timer information to a terminal device. The timer information may be information used to indicate a type of a timer. For example, the timer information may indicate a downlink BWP implicit deactivation timer, a cell implicit deactivation timer, a discontinuous reception-inactivity timer such as drx-InactivityTimer, and the like. Therefore, the terminal device may determine a corresponding timer based on the timer information, to start or restart the timer and ensure normal data transmission.

In a possible design, the network device may send, to the terminal device, timer information used to indicate a downlink BWP implicit deactivation timer.

In a possible design, the network device sends, to the terminal device, timer information used to indicate a cell implicit deactivation timer.

In a possible design, the network device may send, to the terminal device, timer information used to indicate a discontinuous reception inactivity timer.

According to still another aspect, an embodiment of the present invention further provides an information indication method, including: receiving, by a terminal device, timer information sent by a network device. The timer information may be information used to indicate a type of a timer. For example, the timer information may indicate a downlink BWP implicit deactivation timer, a cell implicit deactivation timer, a discontinuous reception-inactivity timer such as drx-InactivityTimer, and the like. In this case, the terminal device may determine a corresponding timer based on the timer information, to start or restart the timer and ensure normal data transmission.

In a possible design, the network device may receive timer information that is used to indicate a downlink BWP implicit deactivation timer and that is sent by the network device. In this case, the terminal device may determine the downlink BWP implicit deactivation timer based on the timer information. Further, after the timer expires, the terminal device may fall back to an initial BWP. The initial BWP may be preconfigured by the network device for the terminal device. When the terminal device receives downlink data on a pre-allocated resource in a primary cell or a secondary cell, or the terminal device receives an activation/deactivation instruction for a pre-allocated resource, or other control signaling scrambled by using a dedicated radio network identifier, the terminal device may start or restart the timer. This helps ensure normal transmission of data.

In a possible design, the terminal device may receive timer information that is used to indicate a cell implicit deactivation timer and that is sent by the network device. In this case, the terminal device may determine the cell implicit deactivation timer based on the timer information. When the terminal device receives downlink data on a pre-allocated resource in a secondary cell, or the terminal device receives an activation/deactivation instruction for a pre-allocated resource, or other control signaling scrambled by using a dedicated radio network identifier, the terminal device may start or restart the cell deactivation timer. This can reduce power consumption of the terminal device, and ensure normal transmission of data.

In a possible design, the terminal device may receive timer information that is used to indicate a discontinuous reception inactivity timer and that is sent by the network device. When the terminal device receives initially transmitted or retransmitted downlink data on a pre-allocated resource, the terminal device may start or restart the timer. This helps timely transmission of data.

In a possible design, the pre-allocated resource may be an uplink resource or a downlink resource.

According to still another aspect, an embodiment of the present invention further provides a terminal device. The terminal device has some or all functions of implementing actions of the terminal device in the foregoing method examples. For example, functions of the terminal device may have functions in some or all embodiments of this application, or may have a function of independently implementing any embodiment of this application. The function may be implemented by hardware, or may be implemented by hardware by executing corresponding software. The hardware or the software includes one or more units or modules corresponding to the foregoing function.

In a possible design, a structure of the terminal device may include a processing unit and a communications unit. The processing unit is configured to support the terminal device in performing a corresponding function in the foregoing methods. The communications unit is configured to support communication between the terminal device and another device. The terminal device may further include a storage unit. The storage unit is configured to couple to the processing unit, and stores a program instruction and data that are necessary for the terminal device. In an example, the processing unit may be a processor, the communications unit may be a transceiver, and the storage unit may be a memory.

According to still another aspect, an embodiment of the present invention provides a network device. The network device has some or all functions of implementing actions of the network device in the foregoing method examples. For example, the network device may have functions in some or all embodiments of this application, or may have a function of independently implementing any embodiment of this application. The function may be implemented by hardware, or may be implemented by hardware by executing corresponding software. The hardware or the software includes one or more units or modules corresponding to the foregoing functions.

In a possible design, a structure of the network device includes a processing unit and a communications unit. The processing unit is configured to support the network device in performing the corresponding functions in the foregoing methods. The communications unit is configured to support communication between the network device and another device. The network device may further include a storage unit. The storage unit is coupled to the processing unit, and the storage unit stores a program instruction and data that are necessary for the network device. In an example, the processing unit may be a processor, the communications unit may be a transceiver, and the storage unit may be a memory.

According to still another aspect, an embodiment of the present invention provides a communications system, and the system includes the terminal device and/or the network device in the foregoing aspects. In another possible design, the system may further include another device that interacts with the terminal device or the network device in the solutions provided in the embodiments of the present invention.

According to still another aspect, an embodiment of the present invention provides a computer storage medium, configured to store a computer software instruction used by the foregoing terminal device. The computer software instruction includes a program designed for performing any one of the foregoing aspects.

According to still another aspect, an embodiment of the present invention provides a computer storage medium, configured to store a computer software instruction used by the foregoing network device. The computer software instruction includes a program designed for performing any one of the foregoing aspects.

According to still another aspect, this application further provides a computer program product including an instruction. When the computer program product is run on a computer, the computer is enabled to perform the methods described in all the foregoing aspects.

According to still another aspect, this application provides a chip system. The chip system includes a processor, configured to support a terminal device in implementing the functions in the foregoing aspects, such as generating or processing the data and/or the information in the foregoing methods. In a possible design, the chip system further includes a memory. The memory is configured to store a program instruction and data that are necessary for the terminal device. The chip system may include a chip, or may include a chip and another discrete device.

According to still another aspect, this application provides a chip system. The chip system includes a processor, configured to support a network device in implementing the functions in the foregoing aspects, for example, receiving or processing the data and/or the information in the foregoing methods. In a possible design, the chip system further includes a memory. The memory is configured to store a program instruction and data that are necessary for the network device. The chip system may include a chip, or may include a chip and another discrete device.

In the solutions provided in the embodiments of the present invention, the terminal device can obtain actual time domain requirement information of the data transmission, and indicate the time domain requirement information to the network device, so that the network device can allocate a resource based on the actual time domain requirement information of the data transmission. This helps reduce a data transmission delay and improve data transmission reliability.

BRIEF DESCRIPTION OF DRAWINGS

To describe the technical solutions in the embodiments of the present disclosure or in the background more clearly, the following describes the accompanying drawings required in the embodiments of the present disclosure or the background.

FIG. 2b is a schematic diagram of a resource allocation scenario according to an embodiment of the present disclosure;

FIG. 3 is a schematic flowchart of an information indication method according to an embodiment of the present disclosure;

DESCRIPTION OF EMBODIMENTS

Figure 1:
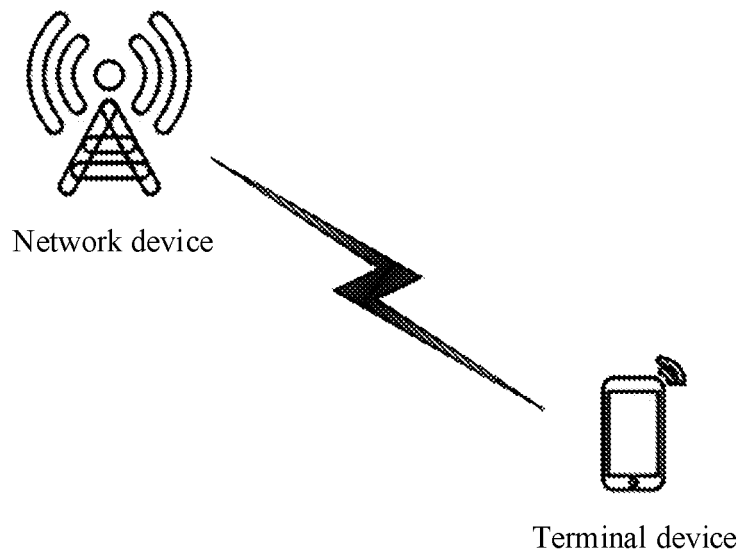
FIG. 1 is a diagram of an application scenario of a communications system according to an embodiment of the present disclosure.

The following describes the embodiments of the present invention with reference to the accompanying drawings in the embodiments of the present invention.

It should be understood that the technical solutions in this application may be specifically applied to various communications systems, for example, global system for mobile communications (GSM for short), code division multiple access (CDMA for short), wideband code division multiple access (WCDMA for short), time division-synchronous code division multiple access (TD-SCDMA for short), universal mobile telecommunications system (UMTS for short), and long term evolution (LTE for short) systems. With continuous development of communications technologies, the technical solutions in this application may be further applied to a future network, for example, a 5G system, or referred to as a new radio (NR for short) network, or the technical solutions may be applied to a D2D (device to device) system, an M2M (machine to machine) system, or the like.

A network device in this application may be an entity used to send or receive information at a network side, and may be, for example, a base station, a transmission point (TP for short), a transmission reception point (transmission and receiver point, TRP for short), a relay device, or another network device that has a base station function. This is not limited in this application.

In this application, a terminal device is a device having a communication function, and may be, for example, a handheld device having a wireless communication function, a vehicle-mounted device, a wearable device, a computing device, or another processing device connected to a wireless modem. The terminal device may have different names in different networks, for example, a terminal, user equipment (UE for short), a mobile station, a subscriber unit, a station, a cellular phone, a personal digital assistant, a wireless modem, a wireless communications device, a handheld device, a laptop computer, a cordless phone, and a wireless local loop station. The terminal device may be a wireless terminal or a wired terminal. The wireless terminal may be a device that provides a user with voice and/or data connectivity, a handheld device with a wireless connection function, or another processing device connected to a wireless modem. The wireless terminal may communicate with one or more core networks by using a radio access network (for example, RAN, radio access network).

In this application, a base station may also be referred to as a base station device, which is a device that is deployed in a radio access network to provide a wireless communication function. Names of base stations in different radio access systems may be different. For example, a base station in a UMTS network is referred to as a NodeB, a base station in an LTE network is referred to as an evolved NodeB (eNB or eNodeB for short), a base station in a 5G system may be referred to as a TRP network node or a gNodeB (g-NodeB, gNB), and so on. This is not listed one by one herein.

In this application, a time unit may be a unit used for data transmission in time domain, or may be referred to as a scheduling unit or another name. Optionally, the time unit may be a subframe, may be a slot (slot), may be a radio frame, a mini slot (mini slot or sub slot), a plurality of aggregated slots, a plurality of aggregated subframes, a symbol, duration of a pre-allocated resource, or the like, may be a transmission time interval (TTI for short), or may be a scheduling occasion or the like. This is not limited in this application. The slot may be a long slot, or may be a short slot. For example, the long slot may be seven symbols, and the short slot may be L symbols, where L is less than 7. A quantity of symbols in the long slot is not limited to 7. This is not limited in this application.

The following describes an application scenario of this application. FIG. 1 is an architectural diagram of a communications system according to an embodiment of the present invention. Specifically, as shown in FIG. 1, the communications system may include a terminal device and a network device, and the terminal device and the network device may communicate with each other by using the foregoing communications system. Specifically, the network device may allocate a resource to the terminal device, so that the terminal device may transmit data by using the allocated resource.

Figure 2A:
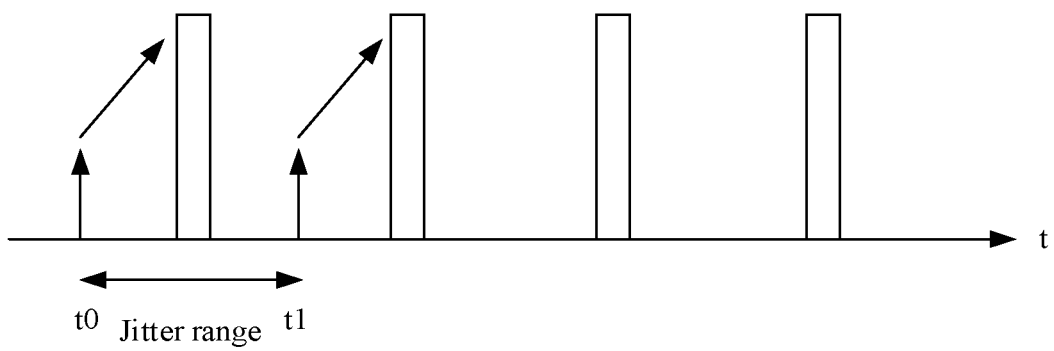
FIG. 2a is a schematic diagram of a data transmission scenario according to an embodiment of the present disclosure.

In an actual data transmission process, a case in which an allocated resource such as a periodic resource does not match a time at which the resource is required in the data transmission often occurs, resulting in a delay in transmission of the data. For example, because a generation time of the data is uncertain, or a jitter occurs when the terminal device performs actual data transmission, the time at which the resource is required in the data transmission changes. For example, as shown in FIG. 2*a*, it is assumed that a resource allocated by the network device to the terminal device is that shown by a rectangular column in FIG. 2*a*. Data of the terminal device jitters within a range from t0 to t1, and the terminal device can transmit data only on a next allocated resource after the jitter, resulting in a relatively high delay. Therefore, a resource needs to be allocated to the terminal device based on an actual requirement of data transmission. For example, as shown in FIG. 2*b*, the network device may adjust a time domain position, and allocate a resource to the terminal device based on the actual requirement of the data transmission performed by the terminal device, to reduce a data transmission delay.

This application discloses an information indication method, a terminal device, and a network device, to help reduce a data transmission delay and improve data transmission reliability. Details are separately described below.

FIG. 3 is a schematic flowchart of an information indication method according to an embodiment of the present invention. Specifically, as shown in FIG. 3, the information indication method in this embodiment of the present invention may include the following steps.

301. A terminal device determines time domain requirement information of data transmission, where the time domain requirement information includes at least one of time adjustment information, jitter time information, time domain resource information, latest sending time information, and remaining duration of the data transmission.

The time adjustment information may be used to indicate allocation of a resource for the data transmission, the jitter time information may be used to indicate a time range in which the data is generated, the time domain resource information may be used to indicate a sending time of the data, and the latest sending time information and/or the remaining duration may be used to indicate a latest sending time of the data. Optionally, the time adjustment information may include a time adjustment value indicating resource adjustment, adjusted resource information, or the like. The jitter time information may include a start time or a latest time at which the data may be generated, and/or duration for which the data may be generated, may be a start resource position or an end resource position at which the data may be generated, and/or a quantity of resources (that is, a quantity of time units) in which the data may be generated, or may be an offset or the like of a jitter relative to an allocated resource. The time domain resource information may include an actual sending time of the data, a position at which the data is to be sent or has been sent by using the allocated resource, or the like. The latest sending time information may include the latest sending time, a resource position corresponding to the latest sending time, a timing offset of the latest sending time relative to the allocated resource, or the like. The remaining duration may include a remaining time length for the data transmission, and the like. This is not limited in this application.

302. The terminal device sends the time domain requirement information to a network device.

Further, after determining the time domain requirement information of the data transmission, the terminal device may send the time domain requirement information to the network device. Therefore, after receiving the time domain requirement information, the network device can allocate a resource to the terminal device based on the time domain requirement information. The allocation includes allocating a new resource, adjusting the allocated resource, and so on, thereby reducing a data transmission delay, and improving data transmission reliability.

Optionally, the allocation may include adjustment of the allocated resource for the data, the time domain requirement information may further include channel information, and the channel information may be used to indicate a channel associated with the allocated resource. The channel associated with the resource may be a data transmission channel corresponding to the resource, that is, a channel on which the terminal device transmits the data by using the allocated resource. Further, optionally, different allocated resources may be associated with a same channel or different channels. In this case, by indicating, to the network device, the channel associated with the allocated resource for the data, the terminal device can improve efficiency of determining a resource position that needs to be adjusted.

Optionally, the allocation may include adjustment of the allocated resource for the data, the allocated resource may include at least one group of resources, the time domain requirement information may further include a resource identifier such as a resource index, and the resource identifier may be used to indicate a resource, in the at least one group of resources, whose resource position needs to be adjusted. The at least one group of resources may be frequency domain resources. Specifically, the network device may allocate a plurality of groups (a plurality of sets) of resources to the terminal device, and resources that are used by the terminal device for the data transmission and that do not match a time at which the resources are required for the data transmission are one or more groups of resources in the plurality of groups of resources. In this case, the terminal device may further indicate, to the network device, resource identifiers of the one or more groups of resources, that is, identifiers of resources whose resource positions need to be adjusted, so that the network device can adjust the resources corresponding to the resource identifiers, without a need to adjust all allocated resources. This reduces power consumption of the network device, and improves accuracy of determining allocated resources for resource position adjustment.

Further, optionally, before the terminal device sends the time domain requirement information to the network device, the terminal device may further detect whether a difference between a generation time of the data and a time of the allocated resource that can be used to send the data after the data is generated exceeds a preset threshold. When the difference exceeds the preset threshold, the terminal device is triggered to send the time domain requirement information to the network device. This helps the network device perform resource allocation on the terminal device based on the time domain requirement information. The allocated resource that may be used to send the data after the data is generated may be a next available resource or an adjacent available resource after the data is generated. In this way, the network device can be instructed to adjust a resource when a delay is relatively high, thereby reducing the power consumption of the device. Alternatively, the terminal device may periodically obtain the time domain requirement information, or the terminal device may obtain time domain requirement information of a periodically allocated resource for initial data transmission, and send the time domain requirement information to the network device. This is not limited in this application. Optionally, the generation time of the data may be a moment at which the data arrives at an access stratum or a moment at which the data is generated at an application layer. The preset threshold may be preconfigured, or may be notified by the network device to the terminal device by using signaling. This is not limited in this application.

Optionally, the time domain requirement information may include the time adjustment information. Further, the terminal device may receive an acknowledgment message sent by the network device, and transmit the data by using the resource indicated by the time adjustment information. In other words, the terminal device may send the network device the time domain requirement information including the time adjustment information. In this way, the network device may allocate a resource based on the time adjustment information. For example, the network device may return an acknowledgment message to the terminal device, to instruct the terminal device to perform resource adjustment on the resource indicated by the time adjustment information. Therefore, the terminal device can use the resource indicated by the time adjustment information as a new allocated resource after the adjustment, and can transmit data by using the resource indicated by the time adjustment information, thereby improving resource allocation efficiency.

Further, optionally, the terminal device may further obtain frequency domain requirement information of the data transmission, and may send the frequency domain requirement information to the network device, so that the network device can allocate the resource for the data transmission to the terminal device with reference to the frequency domain requirement information.

Further, optionally, the time domain requirement information and/or the frequency domain requirement information may be carried in physical layer signaling such as physical layer uplink control information, or may be carried in MAC layer signaling such as MAC CE information, or carried in higher layer signaling such as an RRC message. Alternatively, optionally, the time domain requirement information and/or the frequency domain requirement information may be reported in a user plane, for example, carried in a protocol subheader (a header of a data packet). For example, a transmission time requirement of the data packet may be indicated in an SDAP subheader, a PDCP subheader, an RLC subheader, or a MAC subheader. A manner of reporting the time domain requirement information and/or the frequency domain requirement information is not limited in this application.

In this embodiment of the present invention, the terminal device can obtain actual time domain requirement information of the data transmission, and indicate the time domain requirement information to the network device, so that the network device can allocate a resource based on the actual time domain requirement information of the data transmission. This helps reduce a data transmission delay and improve data transmission reliability.

Figure 4:
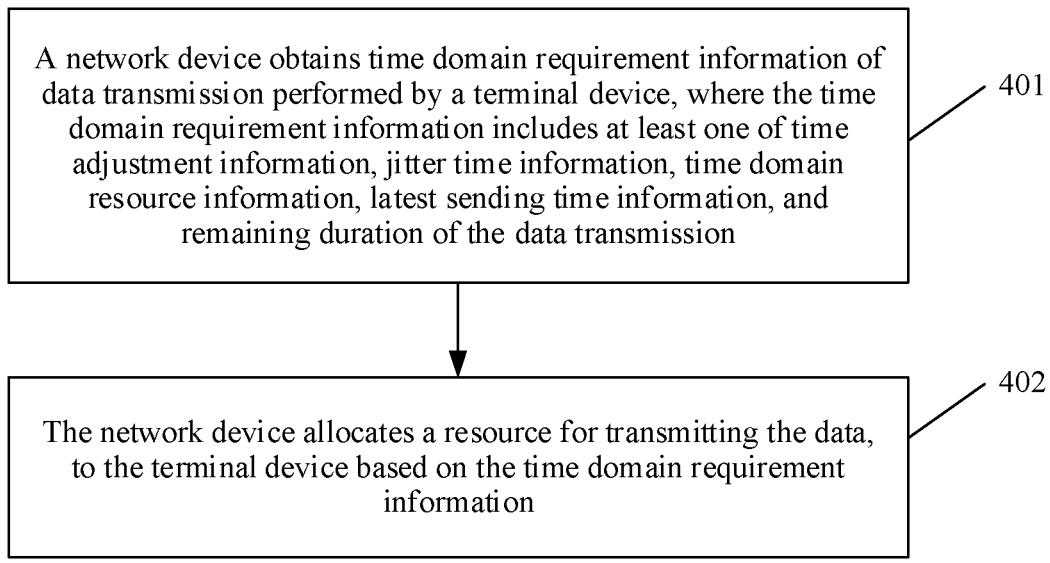
FIG. 4 is a schematic flowchart of another information indication method according to an embodiment of the present disclosure.

FIG. 4 is a schematic flowchart of another information indication method according to an embodiment of the present invention. Specifically, as shown in FIG. 4, the information indication method in this embodiment of the present invention may include the following steps.

401. A network device obtains time domain requirement information of data transmission performed by a terminal device, where the time domain requirement information includes at least one of time adjustment information, jitter time information, time domain resource information, latest sending time information, and remaining duration of the data transmission.

The time adjustment information may be used to indicate allocation of a resource for the data transmission, the jitter time information may be used to indicate a time range in which the data is generated, the time domain resource information may be used to indicate a sending time of the data, and the latest sending time information and/or the remaining duration may be used to indicate a latest sending time of the data.

Optionally, when obtaining the time domain requirement information of the data transmission performed by the terminal device, the network device may receive the time domain requirement information sent by the terminal device, or may obtain, from a network side such as a core network entity or a network management system, the time domain requirement information of the data transmission performed by the terminal device. This is not limited in this application.

402. The network device allocates a resource for transmitting the data, to the terminal device based on the time domain requirement information.

The allocation includes allocating a new resource to the terminal device, or adjusting an allocated resource of the terminal device. Specifically, if the network device does not allocate, to the terminal device, the resource for transmitting the data, the network device may allocate a new resource for transmitting the data, to the terminal device based on the time domain requirement information. If the network device has allocated, to the terminal device, the resource for transmitting the data, the network device may adjust the allocated resource, based on the time domain requirement information.

Optionally, the allocation may include adjustment of the allocated resource for the data, the time domain requirement information may further include channel information, and the channel information may be used to indicate a channel associated with the allocated resource. The channel associated with the resource may be a data transmission channel corresponding to the resource, that is, a channel on which the terminal device transmits the data by using the allocated resource. Further, optionally, different allocated resources may be associated with a same channel or different channels. In this case, the network device can quickly obtain information about the allocated resource based on the channel information, and can adjust resources for the terminal device with reference to resource allocation of the channel, thereby improving efficiency of determining a resource position that needs to be adjusted, and further improving reliability of adjusting the allocated resource for the data.

Optionally, the allocation may include adjustment of the allocated resource for the data, the allocated resource may include at least one group of resources, the time domain requirement information may further include a resource identifier, and the resource identifier may be used to indicate a resource, in the at least one group of resources, whose resource position needs to be adjusted. The at least one group of resources may be frequency domain resources. Specifically, after receiving the time domain requirement information including the resource identifier, the network device may adjust a resource corresponding to the resource identifier, without a need of adjusting all allocated resources. This reduces power consumption of the network device, and improves accuracy of determining allocated resources for resource position re-adjustment.

Optionally, the time domain requirement information may include the time adjustment information. When the network device allocates a resource for transmitting the data, to the terminal device based on the time domain requirement information, if the network device confirms that the resource allocated to the terminal device can be adjusted based on an adjustment value indicated by the time adjustment information, the network device may send an acknowledgment message to the terminal device for the time adjustment information, to instruct the terminal device to transmit the data by using the resource indicated by the time adjustment information, thereby completing re-allocation (adjustment) of the resource used by the terminal device to transmit the data.

Optionally, when allocating a resource for transmitting the data, to the terminal device based on the time domain requirement information, the network device may allocate a resource group for transmitting the data, to the terminal device based on the time domain requirement information, where the resource group includes at least three resources, and interval time lengths of the at least three resources may be different. In other words, after obtaining the time domain requirement information, the network device may further allocate a resource group including a plurality of irregular resources to the terminal device based on the time domain requirement information. Irregular means that interval time lengths of two adjacent resources are different, that is, interval lengths in time domain are different. Compared with allocation of regular resource groups with a same interval time length, this type of allocation improves resource allocation flexibility and improves data transmission reliability.

Further, optionally, interval time lengths of any two adjacent resources in the at least three resources may be different, and the closer to the latest sending time of the data, the shorter an interval time length of adjacent resources in the at least three resources may be.

In this embodiment of the present invention, the network device may obtain actual requirement information for the data transmission performed by the terminal device, for example, receive the time domain requirement information sent by the terminal device, or obtain the time domain requirement information from the network side, and then allocate a resource based on the actual requirement information for the data transmission. This helps reduce a data transmission delay, and improve data transmission reliability.

Figure 5:
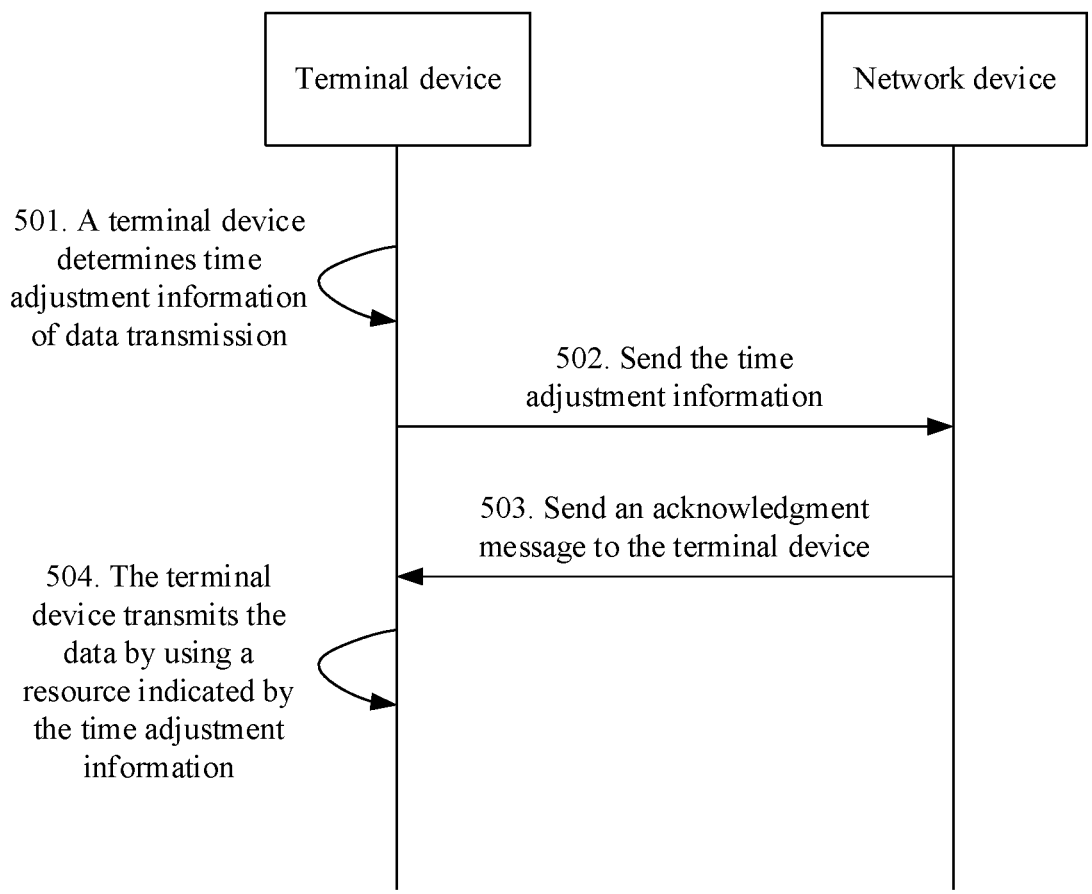
FIG. 5 is a schematic interaction diagram of an information indication method according to an embodiment of the present disclosure.

FIG. 5 is a schematic interaction diagram of an information indication method according to an embodiment of the present invention. Specifically, as shown in FIG. 5, the information indication method in this embodiment of the present invention may include the following steps.

501. A terminal device determines time adjustment information of data transmission.

Specifically, the time adjustment information may be used to indicate allocation of a resource for the data transmission, for example, indicate a time adjustment value for resource adjustment or resource information obtained after the adjustment. Optionally, the time adjustment information may be bit information, so that the bit information may be used to indicate the time adjustment value. For example, the terminal device may use one bit to indicate the time adjustment value. For example, 1 indicates M time units ahead of time, and 0 indicates N time units behind of time. The time unit may be a slot, a subframe, a symbol, or the like. Details are not described herein. Alternatively, optionally, the time adjustment information may be text information, or the time adjustment information may be information in another format agreed on by the terminal device and a network device. This is not limited in this application.

Optionally, the time adjustment information may be carried in physical layer signaling such as physical layer uplink control information, may be carried in MAC layer signaling such as MAC CE information, or carried in higher layer signaling such as an RRC message; or may be carried in a protocol subheader, or the like. Details are not described herein.

502. The terminal device sends the time adjustment information to the network device.

503. The network device sends an acknowledgment message to the terminal device for the time adjustment information. Specifically, after determining the time adjustment information, the terminal device may send the time adjustment information to the network device, to indicate resource allocation by the network device. Further, the network device may send a response message to the terminal device for the time adjustment information. For example, if the network device determines that the terminal device can adjust a resource based on the time adjustment information, the network device may send the acknowledgment message for the time adjustment information to the terminal device, to instruct the terminal device to transmit the data by using the resource indicated by the time adjustment information.

Optionally, the allocation may include adjustment of the allocated resource for the data, the time domain requirement information may further include channel information, and the channel information may be used to indicate a channel associated with the allocated resource. For example, if the network device can determine, with reference to actual transmission of the channel associated with the allocated resource and the resource allocation, that the terminal device can adjust a resource based on the time adjustment information, the network device may send the acknowledgment message to the terminal device.

Optionally, the allocation may include adjustment of the allocated resource for the data. The time domain requirement information may further include a resource identifier, and the resource identifier may be used to indicate a resource, in allocated resources, whose resource position needs to be adjusted. In other words, the terminal device may further indicate, to the network device, resource identifiers of one or more groups of resources, that is, identifiers of resources whose resource positions need to be adjusted. In this case, the network device can further determine, with reference to the resource identifiers, whether the terminal device can adjust the resource based on the time adjustment information, and sends the acknowledgment message to the terminal device when determining that the terminal device can adjust the resource based on the time adjustment information. This reduces power consumption of the network device and improves accuracy of determining an allocated resource that needs resource position adjustment.

Optionally, the resource identifier corresponds to each pre-allocated resource (that is, the allocated resource), and the resource identifier may uniquely correspond to one specified time domain and an allocated resource in the specified frequency domain. For example, in a period of a pre-allocated resource, each resource has a unique identifier. In other words, the time adjustment information indicated by the terminal may be time adjustment information of the allocated resource corresponding to the resource identifier.

Optionally, the time adjustment information may be time adjustment information of a jth available resource whose system frame number (SFN for short) is equal to 0, where j is greater than or equal to 0. For example, the time adjustment information may be time adjustment information of the first available resource in the SFN 0.

Further, optionally, before sending the time adjustment information to the network device, the terminal device may further detect whether a difference between a generation time of the data and a time of the allocated resource that can be used to send the data after the data is generated exceeds a preset threshold; determine the time adjustment information when the difference exceeds the preset threshold; and send the time adjustment information to the network device. Alternatively, the terminal device may periodically obtain the time adjustment information. Alternatively, the terminal device may further obtain time adjustment information of a periodically allocated resource for initial data transmission, and send the time adjustment information to the network device. For example, when the generation time of the data is not fixed, that is, when a time is unknown, the terminal device may report the time adjustment information of the allocated resource to the network device by using step 502, when the first data of each burst (burst, that is, a data stream) arrives; or may report a generation time of the first data to the network device. Therefore, the network device can further determine, with reference to the generation time of the data, whether the terminal device can adjust the resource and the like based on the time adjustment information. Details are not described herein.

504. The terminal device transmits the data by using the resource indicated by the time adjustment information.

Specifically, the terminal device may receive the acknowledgment message sent by the network device, may use the resource indicated by the time adjustment information as a new allocated resource, and then may transmit the data by using the new allocated resource.

Optionally, the response message may be a negative acknowledgment message used to indicate that the terminal device cannot perform data transmission based on the resource indicated by the time adjustment information. For example, if the network device determines that the terminal device cannot adjust the resource based on the time adjustment information, for example, the resource is occupied, the network device may send a negative acknowledgment message for the time adjustment information to the terminal device. After receiving the negative acknowledgment message, the terminal device may determine that the terminal device cannot transmit the data by using the resource indicated by the time adjustment information. Therefore, the terminal device may, for example, perform the data transmission by using an original allocated resource, or stop using the allocated resource, that is, suspend the data transmission. This is not limited in this application.

Further, optionally, the response message may be bit information. For example, the terminal device may indicate the response message by using one bit. For example, 1 indicates an acknowledgment message, and 0 indicates a negative acknowledgment message. Alternatively, optionally, the response message may be text information. For example, the acknowledgment message is an ACK, and the negative acknowledgment message is a NACK. Alternatively, the response message may be information in another format agreed on by the terminal device and the network device. This is not limited in this application.

Further, optionally, the terminal device may further start a timer after step 502. During operation of the timer, that is, within a duration range corresponding to the timer, the terminal device may send the data by using the resource that requests time adjustment, that is, the resource indicated by the time adjustment information, or may send the data by using the original allocated resource. if no response message sent by the network device is received when the timer expires, the terminal device may perform data transmission by using the original allocated resource; stop using the allocated resource; or perform the data transmission by using the resource indicated by the time adjustment information, so that the adjusted resource can be immediately used to send the data, thereby improving data transmission efficiency and reliability. However, the adjusted resource may be used by another terminal device, and a conflict may occur. A data transmission manner that the terminal device uses after the timer expires and no response message sent by the network device is received is not limited in this application.

In this embodiment of the present invention, the terminal device can obtain the time adjustment information of the data transmission, and send the time adjustment information to the network device. Therefore, after the network device determines that the terminal device can adjust the resource based on the time adjustment information and returns the acknowledgment message for the time adjustment information to the terminal device, the terminal device can directly perform data transmission by using the resource indicated by the time adjustment information. This helps reduce a data transmission delay, improve data transmission reliability, and reduce power consumption of the network device. According to this embodiment of the present invention, the UE does not need to notify a network side of an actual required time for the data transmission, but uses a relative-time adjustment amount. In this case, overheads are low. If the overheads are low, an adjustment request command helps quickly notify the network device by using a physical layer instruction.

Figure 6:
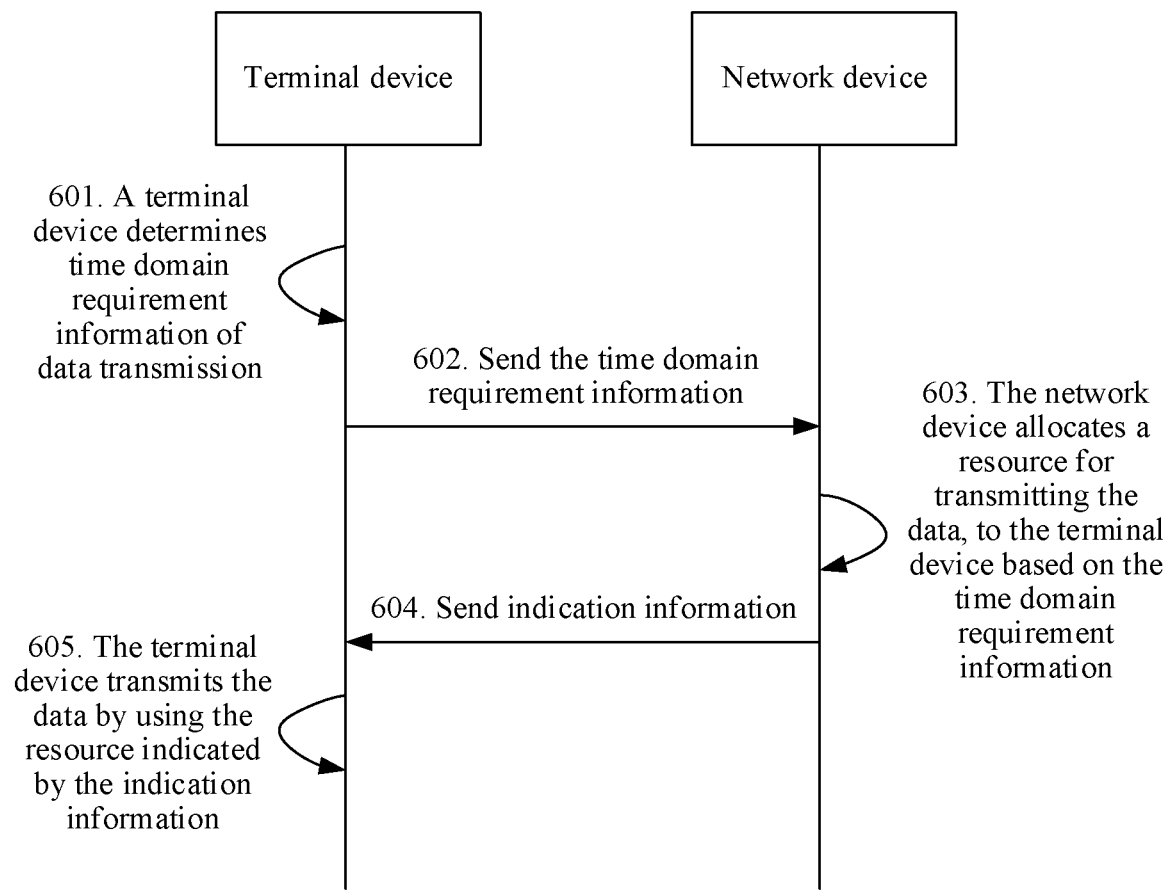
FIG. 6 is a schematic interaction diagram of another information indication method according to an embodiment of the present disclosure.

FIG. 6 is a schematic interaction diagram of an information indication method according to an embodiment of the present invention. Specifically, as shown in FIG. 6, the information indication method in this embodiment of the present invention may include the following steps.

601. A terminal device determines time domain requirement information of data transmission, where the time domain requirement information includes at least one of time adjustment information, jitter time information, time domain resource information, latest sending time information, and remaining duration of the data transmission.

Optionally, the time domain requirement information further includes channel information and/or a resource identifier, the channel information may be used to indicate channels associated with allocated resources for the data, and the resource identifier may be used to indicate a resource, in the allocated resources, whose resource position needs to be adjusted.

Specifically, for related descriptions of the time adjustment information, the jitter time information, the time domain resource information, the latest sending time information, the remaining duration, the channel information, and/or the resource identifier, refer to the related descriptions of the embodiments shown in FIG. 3 to FIG. 5. Details are not described herein again.

602. The terminal device sends the time domain requirement information to a network device.

603. The network device allocates a resource for transmitting the data, to the terminal device based on the time domain requirement information.

Specifically, after receiving the time domain requirement information sent by the terminal device, the network device may allocate a resource to the terminal device based on the time domain requirement information, where the allocation includes allocating a new resource or adjusting an allocated resource.

Figure 7:
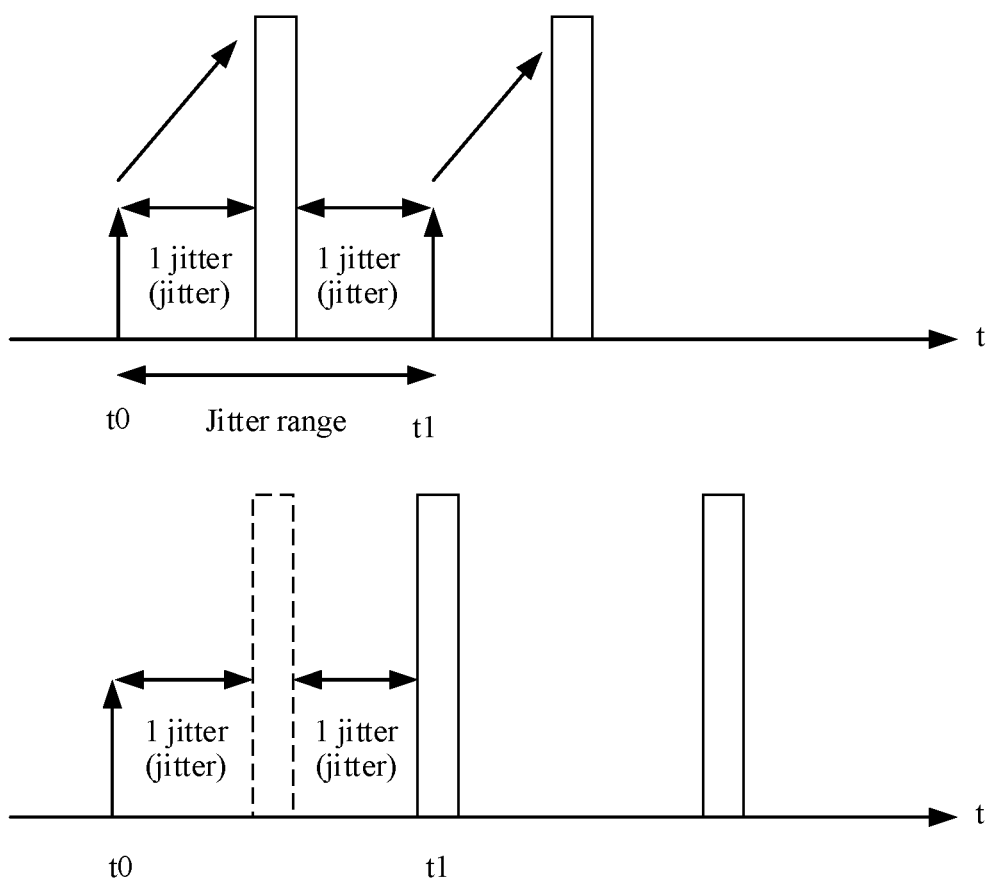
FIG. 7 is a schematic diagram of another resource allocation scenario according to an embodiment of the present disclosure.

For example, if the time domain requirement information may include the jitter time information for the data transmission, the network device may parse the jitter time information to obtain a jitter time range for the data transmission, that is, a time range in which the data is generated, and may allocate a resource to the terminal device at a time after the jitter time range, that is, a time after a latest time at which the data is generated. As shown in FIG. 7, assuming that the jitter time information indicates that the jitter time range is t0 to t1, that is, 2 jitters, the network device may allocate a resource to the terminal device after t1 (which may include t1).

For another example, if the time domain requirement information may include the time domain resource information for the data transmission, the network device may determine, based on the time domain resource information, an actual sending time of the data, for example, a time at which the data is to be sent or has been sent on an allocated resource, and may determine, based on the actual sending time, whether the data sent at the actual sending time is received. If not receiving the data, the network device may allocate a resource to the terminal device. For example, the network device may estimate a time at which a data packet is generated, to adjust a time domain position of the allocated resource, or may release some resources or the like. Optionally, there may be one or more groups of allocated resources. For example, resources may be allocated based on a service priority corresponding to the data. A higher service priority indicates more resources to be allocated. This helps reduce packet loss in a data transmission process, and improve data transmission reliability.

For another example, if the time domain requirement information may include the latest sending time information and/or the remaining duration, the network device may determine a latest sending time of the data based on the latest sending time information and/or the remaining duration, and may allocate a resource to the terminal device at a time after the latest sending time of the data.

For another example, if the time domain requirement information may include the time adjustment information, the network device may allocate a resource to the terminal device based on the time adjustment information, for example, allocate the resource indicated by the time adjustment information to the terminal device as a resource for the data transmission. Alternatively, the network device may allocate, to the terminal device with reference to actual channel resource allocation and transmission, a resource close to a resource position indicated by the time adjustment information. For example, a time interval between the allocated resource and the resource indicated by the time adjustment information may be less than a preset time threshold, or the allocated resource is a resource that can be allocated and that is closest to the resource position indicated by the time adjustment information. Details are not listed herein.

For another example, if the time domain requirement information may include one or more of the time adjustment information, the jitter time information, the time domain resource information, the latest sending time information, and the remaining duration, the network device may separately determine a position of an allocated resource based on the time adjustment information, the jitter time information, the time domain resource information, the latest sending time information, or the remaining duration that is included in the time domain requirement information; select, from the positions of the allocated resources, an earliest resource position that can satisfy a current transmission scenario; and determine a resource corresponding to the earliest resource position as the resource allocated to the terminal device. Alternatively, optionally, a priority may be preset for each piece of time domain requirement information. For example, if the jitter time information has a highest priority, the allocated resource determined based on the jitter time information may be determined as the resource allocated to the mobile terminal. This is not limited in this application.

604. The network device sends indication information to the terminal device, where the indication information is used to indicate information about the allocated resource.

605. The terminal device transmits the data by using the resource indicated by the indication information.

Further, after allocating the resource, the network device may send, to the terminal device, the indication information used to indicate the information about the allocated resource. The terminal device may receive the indication information, and may further perform the data transmission based on the resource indicated by the indication information.

Further, optionally, the terminal device may further obtain frequency domain requirement information for the data transmission, and may send the frequency domain requirement information to the network device. The network device may receive the frequency domain requirement information, and may allocate a resource to the terminal device based on the time domain requirement information and with reference to the frequency domain requirement information, and then indicate the allocated resource to the terminal device. Details are not described herein.

Further, optionally, the terminal device may further start a timer after sending the time domain requirement information to the network device. During operation of the timer, the terminal device may perform data transmission by using the resource indicated by the time domain requirement information, for example, the resource indicated by the time adjustment information, or may perform data transmission by using an original allocated resource. If no response message sent by the network device is received when the timer expires, the terminal device may, for example, perform the data transmission by using the original allocated resource; stop using the allocated resource; or perform the data transmission by using the resource indicated by the time domain requirement information. Details are not described herein. In this case, data transmission efficiency and reliability are improved.

In this embodiment of the present invention, the terminal device can obtain the time domain requirement information such as the time adjustment information, the jitter time information, the time domain resource information, the latest sending time information, and/or the remaining duration of the data transmission, and send the time domain requirement information to the network device. In this way, the network device determines to allocate a resource to the terminal device based on the time domain requirement information, and can indicate information about the allocated resource to the terminal device, so that the terminal device can perform data transmission by using the indicated resource. This helps reduce a data transmission delay, improve data transmission reliability, and reduce power consumption of the network device.

Figure 8:
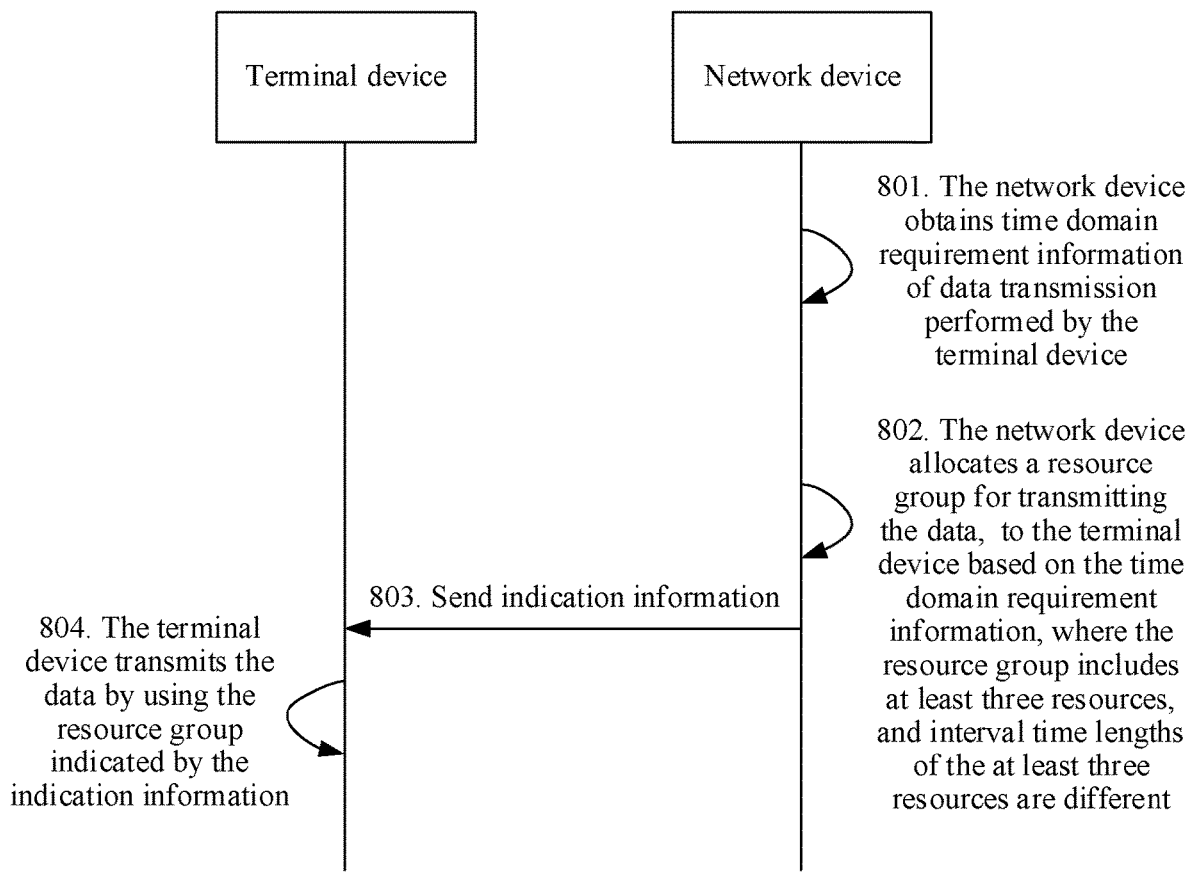
FIG. 8 is a schematic interaction diagram of still another information indication method according to an embodiment of the present disclosure.

FIG. 8 is a schematic interaction diagram of still another information indication method according to an embodiment of the present invention. Specifically, as shown in FIG. 8, the information indication method in this embodiment of the present invention may include the following steps.

801. A network device obtains time domain requirement information of data transmission performed by a terminal device.

The time domain requirement information may include at least one of time adjustment information, jitter time information, time domain resource information, latest sending time information, and remaining duration of the data transmission. Optionally, the time domain requirement information may further include channel information and/or a resource identifier.

Specifically, for related descriptions of the time adjustment information, the jitter time information, the time domain resource information, the latest sending time information, the remaining duration, the channel information, and/or the resource identifier, refer to the related descriptions of the embodiments shown in FIG. 3 to FIG. 5. Details are not described herein again.

Further optionally, the time domain requirement information may be received from the terminal device, or may be obtained from a network side. Details are not described herein.

802. The network device allocates a resource group for transmitting data, to the terminal device based on the time domain requirement information, where the resource group includes at least three resources, and interval time lengths of the at least three resources are different.

That the interval time lengths of the at least three resources are different may mean that resources in the resource group are irregularly configured. Optionally, interval time lengths of any two adjacent resources in the at least three resources may be different, and the closer to a latest sending time of the data, the shorter an interval time length of adjacent resources in the at least three resources may be, that is, more intensive resources may be allocated.

Figure 9A:
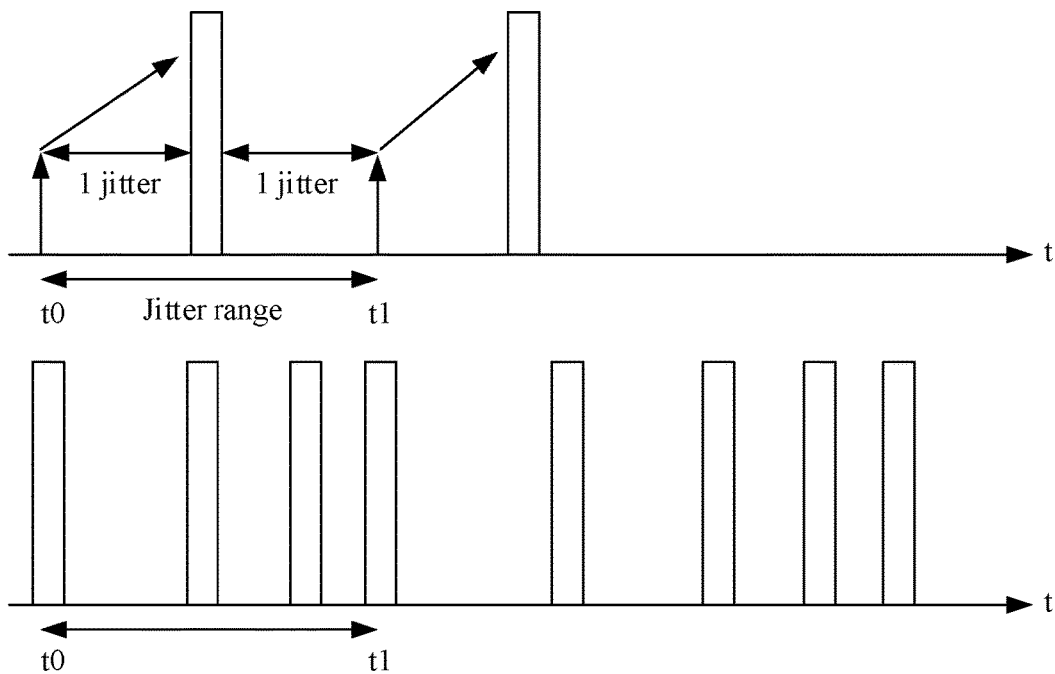
FIG. 9a is a schematic diagram of still another resource allocation scenario according to an embodiment of the present disclosure.
Figure 9B:
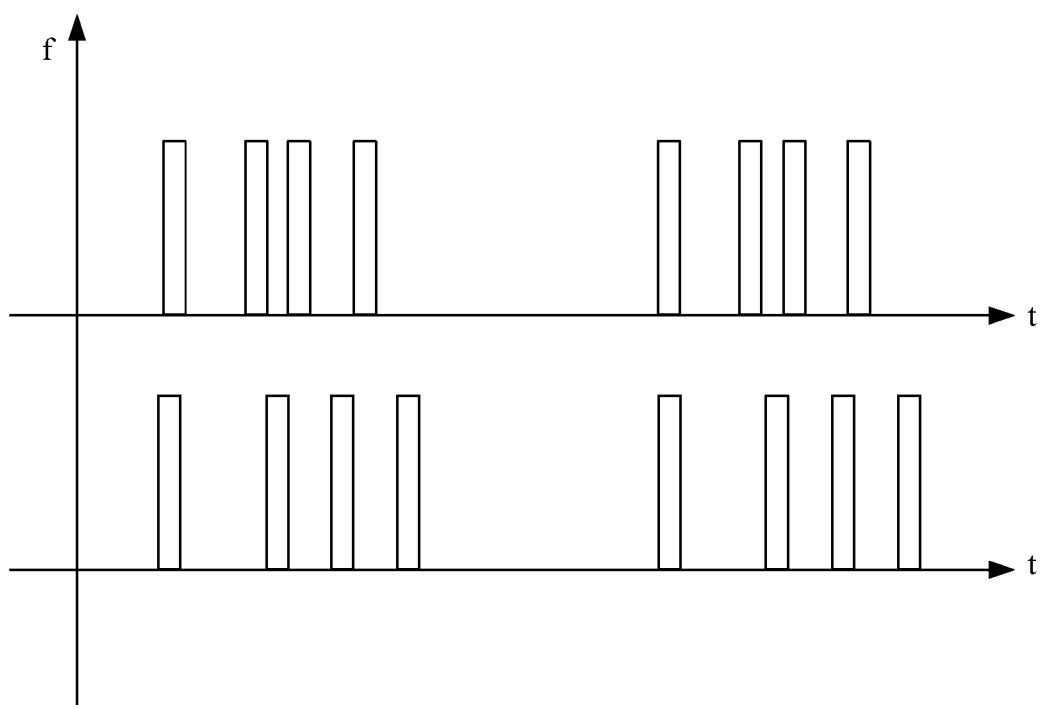
FIG. 9b is a schematic diagram of still another resource allocation scenario according to an embodiment of the present disclosure.

Specifically, after determining time domain requirement information generated for uplink or downlink data, the network device may allocate a group of resources, that is, a resource group. The resource group may be a periodic group of resources, or may be an aperiodic group of resources. The resource group includes a plurality of resources that are irregularly configured. For example, as shown in FIG. 9*a*, the closer to the latest sending time of the data, more intensive resources are allocated. Alternatively, as shown in FIG. 9*b*, interval time lengths of the plurality of irregularly configured resources may be random or irregular. Optionally, the network device may further allocate a plurality of groups of resources with a same time domain position and different frequency domain positions to the terminal device. At least one group of resources in the plurality of groups of resources include a plurality of irregularly configured resources. For example, the plurality of groups of resources may be resource groups including irregularly configured resources.

803. The network device sends indication information to the terminal device, where the indication information is used to indicate information about the allocated resource group.

804. The terminal device transmits the data by using the resource group indicated by the indication information.

Optionally, the indication information may include a start position of the first resource in the resource group and an interval time length between any two adjacent resources; or may include, for example, a position of each resource in the resource group. This is not limited in this application. In this case, the terminal device can determine, based on the indication information, the position of each resource included in the resource group, and then perform data transmission by using the resource included in the resource group.

In another optional embodiment, the network device may further obtain a service type corresponding to the data or identity information, a service priority, or the like of the terminal device, allocate an irregularly configured resource group to the terminal device, and indicate information about the resource group to the terminal device. Therefore, the terminal device transmits the data based on the information about the resource group. Details are not described herein.

In this embodiment of the present invention, the network device can obtain other information such as the time domain requirement information or the service type for the data transmission; allocate, to the terminal device, the resource group including the irregular resources; and further indicate the information about the allocated resource group to the terminal device. Therefore, the terminal device can perform the data transmission by using the indicated resource group. This helps reduce a data transmission delay, improve data transmission reliability, and reduce power consumption of the network device.

Figure 10:
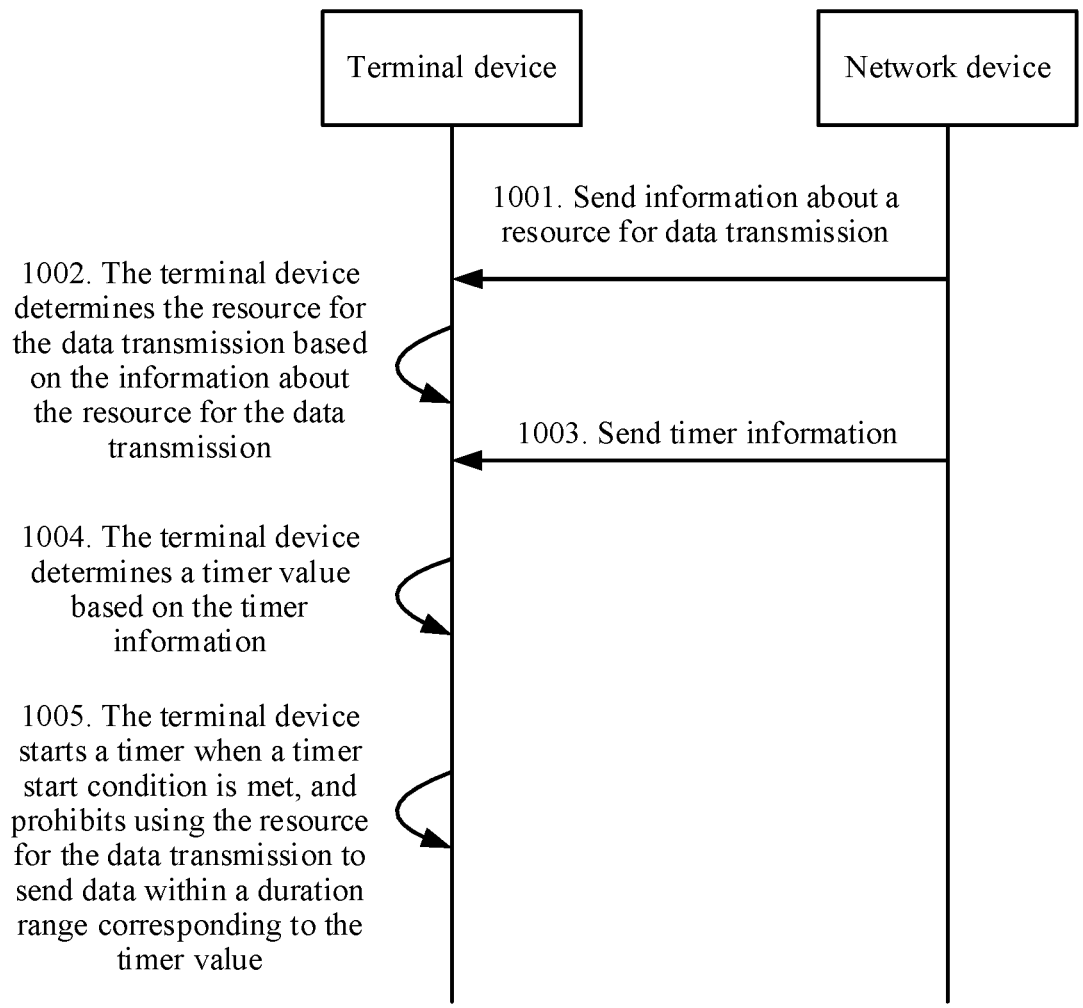
FIG. 10 is a schematic interaction diagram of still another information indication method according to an embodiment of the present disclosure.

FIG. 10 is a schematic interaction diagram of still another information indication method according to an embodiment of the present invention. Specifically, as shown in FIG. 10, the information indication method in this embodiment of the present invention may include the following steps.

1001. A network device sends, to a terminal device, information about a resource for data transmission.

1002. The terminal device determines the resource for the data transmission based on the information about the resource for the data transmission.

Specifically, the network device may allocate the resource to the terminal device for the data transmission, and send, to the terminal device, the information about the allocated resource for the data transmission. Therefore, the terminal device can receive the information about the resource for the data transmission, to determine the resource for the data transmission based on the information about the resource. Optionally, the resource may be a newly allocated resource, or may be a resource allocated after the allocated resource is adjusted. This is not limited in this application. The resource may be referred to as an "allocated resource", a "pre-allocated resource", or the like. The following uses the allocated resource as an example for description.

Further, optionally, the information about the resource may include information about a plurality of groups of (a plurality of sets of) resources, and the plurality of groups of resources may be resources with different frequency domain positions.

1003. The network device sends timer information to the terminal device.

1004. The terminal device determines a timer value based on the timer information.

Specifically, the network device may alternatively determine timer information corresponding to the resource, and send the timer information to the terminal device. In this case, the terminal device can receive the timer information, and further determine, based on the timer information, a timer value corresponding to the timer information. Optionally, the timer information may include information used to indicate one or more timer values. Further, optionally, the information about the resource and/or the timer information may be sent by using higher layer signaling, or may be sent by using physical layer signaling. The information about the resource and the timer information may be sent to the terminal device by using one piece of signaling, or may be sent to the terminal device by using different pieces of signaling (separately sent by using a same type of signaling, or sent by using different types of signaling). For a manner of sending the information about the resource and/or the timer information, no limit is imposed in this application.

Optionally, the timer information may include one or more of a timer value, a numeric value used to indicate a timer value, a quantity of repetition times of a pre-allocated resource, a period of an allocated resource, and the like. Further, optionally, a time unit of the timer value determined based on the timer information may be a symbol, a slot, or a scheduling occasion such as a PDCCH occasion, or may be another time unit. This is not limited in this application.

Optionally, an execution sequence of step 1001 and step 1003 is not limited. For example, step 1003 may be performed before step 1001, or step 1001 and step 1003 may be performed at the same time.

1005. The terminal device starts a timer when a timer start condition is met, and prohibits using the resource for the data transmission to send data within a duration range corresponding to the timer value.

Optionally, the data may include retransmitted or newly transmitted data in the following HARQ process, or may be other to-be-sent data. This is not limited in this application.

Optionally, the timer start condition may be any one or more of the following: the terminal device sends uplink data on the allocated resource in an HARQ process; the terminal device receives grant resource indication information sent by the network device, where the grant resource indication information indicates a grant resource, the grant resource is associated with an HARQ process, and the terminal device sends uplink data on the grant resource indicated by the grant resource indication information; the terminal device receives a dedicated preamble sequence index sent by the network device; and the terminal device receives a dedicated preamble sequence index sent by the network device, and sends a dedicated preamble sequence to the network device based on the preamble sequence index. In other words, when uplink data is sent by using the allocated resource in an HARQ process of the terminal device; when the terminal device receives grant resource indication information sent by the network device, and sends uplink data on a grant resource that is associated with an HARQ process and that is indicated by the grant resource indication information; when the terminal device receives a dedicated preamble sequence index sent by the network device; or when the terminal device receives a dedicated preamble sequence index sent by the network device, and sends a dedicated preamble sequence to the network device based on the dedicated preamble sequence index, it is determined that the timer start condition is met. In this case, the terminal device may start the timer determined by using the timer value, and prohibit using the allocated resource to perform data transmission within the duration range of the timer value.

Further, optionally, the terminal device may further receive an HARQ process identifier, or receive an activation or deactivation instruction for the allocated resource. The terminal device may stop the timer after receiving a scheduling grant of an HARQ process indicated by the HARQ process identifier, or receiving the activation or deactivation instruction for the allocated resource; or may stop the timer when the timer expires, that is, after duration corresponding to the timer value expires. Further, the terminal device may perform data transmission by using the allocated resource.

Specifically, a communications system may support different air interface formats. For example, the communications system may support different subcarrier spacings, different cyclic prefix lengths, different data block sending duration, different waveforms, or the like. A cell may include one or more subresources of different bandwidths, for example, bandwidth parts (BWP for short). Each subresource includes information such as a frequency, a bandwidth, and a subcarrier spacing. Therefore, a cell may have different air interface formats. In addition, different cells may have different air interface formats. Optionally, the timer may be set for different resources. For example, timers are set for a plurality of groups of resources included in the resources. For another example, a timer is set for an uplink resource corresponding to each HARQ process, to control data transmission of the corresponding HARQ process on the allocated resource. Further, optionally, the network device may indicate timer values corresponding to different air interface formats (or BWPs), to meet a requirement of a system on sending prohibition time of different air interface formats.

In a possible implementation, the timer information may include different air interface formats and timer values corresponding to the air interface formats. In this case, the terminal device can determine a value of a used timer based on an air interface format of an uplink resource (that is, an uplink resource sent in uplink, for example, the allocated resource) or an air interface format used during downlink scheduling associated with an uplink resource. For example, the terminal device may use a timer value that corresponds to an air interface format the same as the air interface format of the uplink resource and that is in the timer information, as the value of the timer used by the uplink resource.

In a possible implementation, the timer information may include a value, and the value may be used as a reference value in different air interface formats. In this case, the terminal device can determine a value of a used timer based on an air interface format of an uplink resource (or an air interface format used during downlink scheduling associated with an uplink resource) and the value included in the timer information. For example, the network device configures a value N for the terminal device, that is, a value included in the timer information is N. Assuming that a length of a time unit, for example, a symbol, of an air interface format used during downlink scheduling associated with an uplink resource is M, a value of a timer corresponding to the uplink resource may be a length of N time units of the air interface format, and is converted to an absolute time of N×M. Alternatively, the network device configures a value N for the terminal device, that is, a value included in the timer information is N. If a length of a time unit, for example, a slot, of an air interface format of an uplink resource, is M', a value of a timer corresponding to the uplink resource is a length of N time units of the air interface format, and is converted to an absolute time of N×M'.

In a possible implementation, the timer information may include different subresources such as BWPs and timer values corresponding to the BWPs. In this case, the terminal device can determine a value of a used timer based on a BWP of an uplink resource or a BWP of downlink scheduling associated with an uplink resource. For example, the terminal device may use a timer value that corresponds to a BWP the same as the BWP of the uplink resource and that is in the timer information, as the value of the timer used by the uplink resource.

In a possible implementation, the timer information may include different air interface formats and different values corresponding to the air interface formats. In this case, the terminal device can determine a value of a used timer based on an air interface format of an uplink resource (or an air interface format used during downlink scheduling associated with an uplink resource) and the value corresponding to the air interface format that is included in the timer information. For example, the network device configures a value N for an air interface format 1, that is, the timer information includes an air interface format 1 and a value N corresponding to the air interface format 1. Assuming that the air interface format of the uplink resource is the air interface format 1, and a length of a time unit, for example, a symbol, corresponding to the air interface format 1 is M, the timer value corresponding to the air interface format 1 is a length of N time units of the air interface format, and is converted to an absolute time of N×M. Alternatively, the network device configures a value N' for an air interface format 2, that is, the timer information includes an air interface format 2 and a value N' corresponding to the air interface format 2. If the air interface format of the uplink resource is the air interface format 2, and a length of a time unit, for example, a timeslot of the air interface format 2 is M', the timer value corresponding to the air interface format 2 is a length of N' time units of the air interface format, and is converted to an absolute time N'×M'.

In a possible implementation, the timer information may include different BWPs and different values corresponding to the BWPs. In this case, the terminal device determines, based on a BWP to which an uplink resource belongs (or a BWP to which downlink scheduling associated with an uplink resource belongs), an air interface format corresponding to the BWP, and further determines a value of a used timer based on a value corresponding to the BWP that is included in the timer information and an air interface format of the BWP. For example, the network device configures a value N for a BWP 1, that is, the timer information includes the BWP 1 and a value N corresponding to the BWP 1. Assuming that a BWP of an uplink resource is the BWP 1, and a length of a time unit, for example, a symbol, of an air interface format corresponding to the BWP 1 is M, a timer value corresponding to the BWP 1 is a length of N time units corresponding to the BWP 1, and is converted to an absolute time of N×M. Alternatively, the network device configures a value N' for a BWP 2, that is, the timer information includes the BWP 2 and a value N' corresponding to the BWP 2. Assuming that a BWP of an uplink resource is the BWP 2, and a length of a time unit, for example, a slot, of an air interface format corresponding to the BWP 2 is M', a timer value corresponding to the BWP 2 is a length of N' time units corresponding to the BWP 2, and is converted to an absolute time of N'×M'.

In a possible implementation, the timer information may include one value. The terminal may determine a value of a used timer based on a period of the used allocated resource and the value included in the timer information. For example, if the period is N and the value is P, the terminal device may determine that an absolute time of the value of the used timer is N×P or N/P.

Further, optionally, when downlink scheduling associated with an uplink resource has a plurality of air interface formats or a plurality of BWPs, the terminal device may determine a plurality of timer values based on the plurality of air interface formats or the plurality of BWPs respectively; and may choose to use a largest timer value or a smallest timer value in the plurality of timer values, or may choose to use an average value or the like of the plurality of timer values. This is not limited in this application. For example, the terminal device may choose to use a largest timer value in the plurality of timer values, to avoid missing a possible uplink scheduling occasion in a network, thereby improving scheduling reliability.

It should be understood that the embodiment shown in FIG. 10 may be used together with any one of the embodiments shown in FIG. 3 to FIG. 8, or may be independently used. This is not limited in this application.

Optionally, the resource in all the embodiments of this application is not limited to the resource used to send the data. For example, the resource may alternatively be a pre-allocated resource used to send a scheduling request. In this case, the network device can adjust a time domain position of the allocated resource by using an adjustment request, for example, the time domain requirement information, sent by the terminal device, to quickly update a resource, or save a resource by using resources preconfigured at irregular intervals by the network device.

In another optional embodiment, the network device may send the timer information to the terminal device, and the terminal device may receive the timer information. The timer information may be information used to indicate a type of a timer. For example, the timer information may indicate a downlink BWP implicit deactivation timer, a cell implicit deactivation timer, a discontinuous reception-inactivity timer such as drx-InactivityTimer, and the like. In this case, the terminal device may determine a corresponding timer based on the timer information, to start or restart the timer and ensure normal data transmission.

For example, optionally, the network device may send, to the terminal device, timer information used to indicate a downlink BWP implicit deactivation timer. In this case, the terminal device may determine the downlink BWP implicit deactivation timer based on the timer information. Further, after the timer expires, the terminal device may fall back to an initial BWP. The initial BWP may be preconfigured by the network device for the terminal device. In the prior art, the terminal device restarts the timer only when receiving a downlink scheduling indication, and does not consider whether to start the timer when receiving the downlink data on a pre-allocated resource. As a result, normal data transmission may be interrupted. In this application, when the terminal device receives downlink data on a pre-allocated resource in a primary cell or a secondary cell, or the terminal device receives an activation/deactivation instruction for a pre-allocated resource, or other control signaling scrambled by using a dedicated radio network identifier, the terminal device may start or restart the timer. This helps ensure normal transmission of data.

For another example, optionally, the network device sends, to the terminal device, timer information used to indicate a cell implicit deactivation timer. In this case, the terminal device may determine the cell implicit deactivation timer based on the timer information. When the terminal device receives the downlink data on the pre-allocated resource in the secondary cell, it may be considered that the cell is active. In this case, when the terminal device receives downlink data on a pre-allocated resource in a secondary cell, or the terminal device receives an activation/deactivation instruction for a pre-allocated resource, or other control signaling scrambled by using a dedicated radio network identifier, the terminal device may start or restart the cell deactivation timer. This can reduce power consumption of the terminal device, and ensure normal transmission of data.

For another example, optionally, the network device may send, to the terminal device, timer information used to indicate a discontinuous reception inactivity timer. In the prior art, after the timer expires, the terminal device enters a period of configuring DRX (discontinuous reception, discontinuous reception), enters a periodic sleep mode (sleep mode), stays in DRX-ON for a period of time, stays in DRX-OFF for a period of time, and does not monitor downlink scheduling in the time period of DRX-OFF. To enable that the terminal device can monitor downlink scheduling information after receiving initially transmitted or retransmitted downlink data on the pre-allocated resource, when the terminal device receives the initially transmitted or retransmitted downlink data on the pre-allocated resource, the terminal device may start or restart the timer. This helps timely transmission of data.

Optionally, the pre-allocated resource may be an uplink resource or a downlink resource.

It should be understood that this embodiment may be separately implemented, or may be combined with one or more of the foregoing embodiments in FIG. 3 to FIG. 10, to implement the steps or behavior of the terminal device and/or the network device in some or all of the embodiments of this application. This is not limited in this application.

The foregoing method embodiments are descriptions of examples of the information indication method in this application. Each embodiment is described with emphasis. For a part that is not described in detail in an embodiment, refer to related descriptions in other embodiments.

Figure 11:
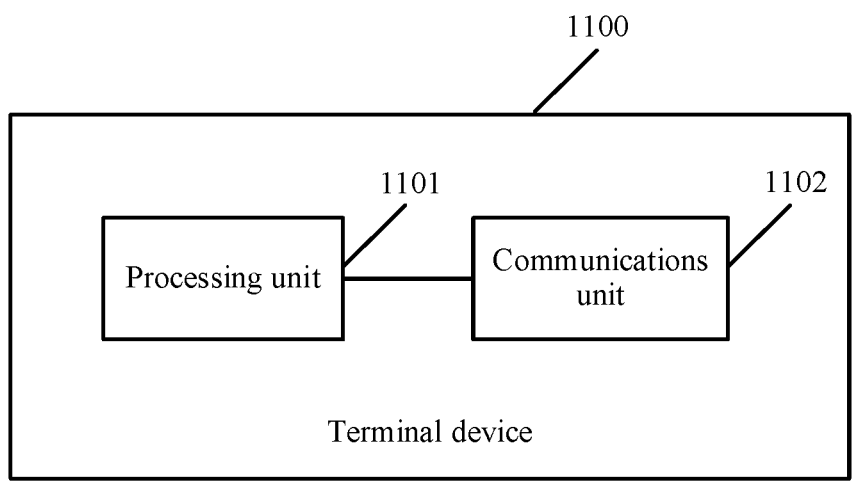
FIG. 11 is a schematic structural diagram of a terminal device according to an embodiment of the present disclosure.

FIG. 11 is a possible schematic structural diagram of a terminal device in the foregoing embodiments. Referring to FIG. 11, the terminal device 1100 may include a processing unit 1101 and a communications unit 1102. These units may perform corresponding functions of the terminal device in the foregoing method examples. For example, the processing unit 1101 is configured to determine time domain requirement information of data transmission, where the time domain requirement information includes at least one of time adjustment information, jitter time information, time domain resource information, latest sending time information, and remaining duration of the data transmission, the time adjustment information is used to indicate allocation of a resource for the data transmission, the jitter time information is used to indicate a time range in which the data is generated, the time domain resource information is used to indicate a sending time of the data, and the latest sending time information and/or the remaining duration is used to indicate a latest sending time of the data; and the communications unit 1102 is configured to send the time domain requirement information to a network device.

Optionally, the allocation includes adjustment of an allocated resource for the data, the time domain requirement information further includes channel information, and the channel information is used to indicate a channel associated with the allocated resource.

Optionally, the allocation includes adjustment of an allocated resource for the data, the allocated resource includes at least one group of resources, the time domain requirement information further includes a resource identifier, and the resource identifier is used to indicate a resource, in the at least one group of resources, whose resource position needs to be adjusted.

Optionally, the communications unit 1102 may be specifically configured to send the time domain requirement information to the network device when a difference between a generation time of the data and a time of an allocated resource that can be used to send the data after the data is generated exceeds a preset threshold.

Optionally, the time domain requirement information includes the time adjustment information; and The communications unit 1102 may be further configured to: receive an acknowledgment message sent by the network device, and transmit the data by using the resource indicated by the time adjustment information.

Optionally, the communications unit 1102 may be further configured to receive information that is about the resource used for the data transmission and that is sent by the network device.

The processing unit 1101 may be further configured to determine the resource for the data transmission based on the information about the resource for the data transmission.

The communications unit 1102 may be further configured to receive timer information sent by the network device.

The processing unit 1101 may be further configured to: determine a timer value based on the timer information; and start a timer when a timer start condition is met, and prohibit using the resource for the data transmission to send data within a duration range corresponding to the timer value.

In a possible design, the timer information may include one or more of: information used to indicate one or more timer values, a quantity of repetition times of a pre-allocated resource, that is, the allocated resource, a period of the allocated resource, and the like.

In a possible design, the information about the resource and/or the timer information may be sent by using higher layer signaling, or may be sent by using physical layer signaling. This is not limited in this application.

In a possible design, the timer start condition may be any one or more of the following: the terminal device sends uplink data on the allocated resource in an HARQ process; the terminal device receives grant resource indication information sent by the network device, where the grant resource indication information indicates a grant resource, the grant resource is associated with an HARQ process, and the terminal device sends uplink data on the grant resource indicated by the grant resource indication information; the terminal device receives a dedicated preamble sequence index sent by the network device; and the terminal device receives a dedicated preamble sequence index sent by the network device, and sends a dedicated preamble sequence to the network device based on the preamble sequence index.

In a possible design, the timer information may include different air interface formats and timer values corresponding to the air interface formats.

In a possible design, the timer information may include a value, and the value may be used as a reference value in different air interface formats.

In a possible design, the timer information may include information about different BWPs and timer values corresponding to the BWPs.

In a possible design, the timer information may include different air interface formats and different values corresponding to the air interface formats.

In a possible design, the timer information may include different BWPs and different values corresponding to the BWPs.

In a possible design, when downlink scheduling associated with an uplink resource has a plurality of air interface formats or a plurality of BWPs, the processing unit 1101 may be further configured to determine a plurality of timer values based on the plurality of air interface formats or the plurality of BWPs.

In a possible design, the processing unit 1101 may be further configured to choose to use a largest timer value in the plurality of timer values.

It should be noted that, in this embodiment of the present invention, unit division is an example, and is merely a logical function division. In actual implementation, another division manner may be used. Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

Figure 12:
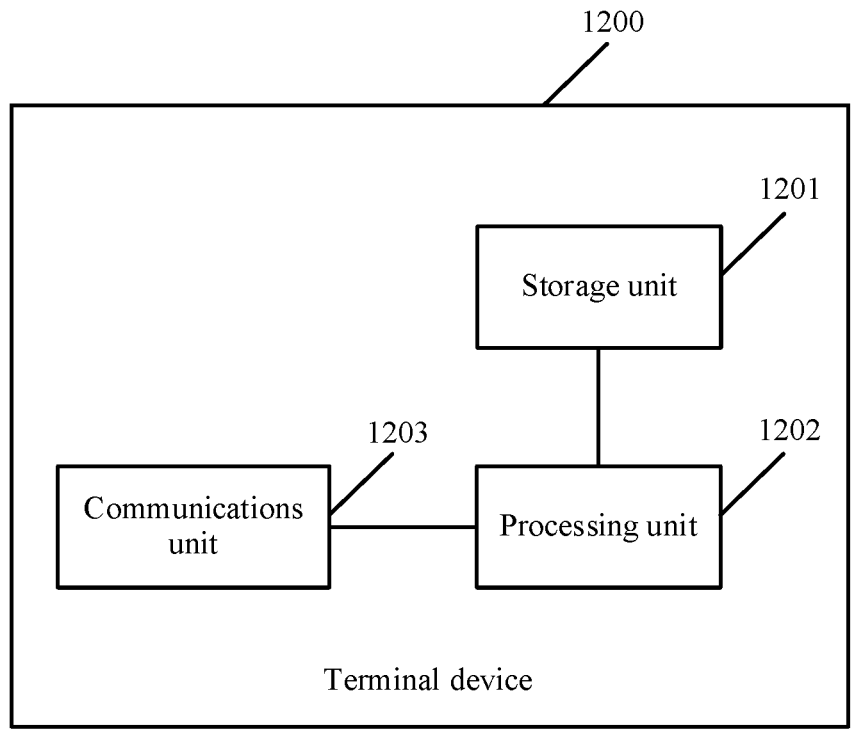
FIG. 12 is a schematic structural diagram of another terminal device according to an embodiment of the present disclosure.

When an integrated unit is used, FIG. 12 is another possible schematic structural diagram of a terminal device in the foregoing embodiments. As shown in FIG. 12, the terminal device 1200 may include a processing unit 1202 and a communications unit 1203. The processing unit 1202 may be configured to control and manage an action of the terminal device. For example, the processing unit 1202 is configured to support the terminal device in performing the process 301 in FIG. 3, the process 501 in FIG. 5, the process 601 in FIG. 6, the processes 1002 and 1004 in FIG. 10, and/or another process of the technology described in this specification. The communications unit 1203 may be configured to support the terminal device in communicating with another network entity, for example, communicating with a network entity such as the network device shown in FIG. 3 to FIG. 8. For example, the communications unit 1203 is configured to support the network device in performing the process 302 in FIG. 3, the process 502 in FIG. 5, the process 602 in FIG. 6, and the like. The terminal device may further include a storage unit 1201, configured to store program code and data of the terminal device.

Both the processing unit 1101 and the processing unit 1202 may be a processor or a controller, for example, may be a central processing unit (CPU for short), a general-purpose processor, a digital signal processor (DSP for short), an application-specific integrated circuit (ASIC for short), a field programmable gate array (FPGA for short) or another programmable logic device, a transistor logic device, or a hardware component, or any combination thereof. The processing unit may implement or execute various example logical blocks, modules, and circuits described with reference to content disclosed in this application. Alternatively, the processor may be a combination implementing a computing function, for example, a combination of one or more microprocessors, or a combination of a DSP and a microprocessor. Both the communication unit 1102 and the communications unit 1203 may be a transceiver. The storage unit 1201 may be a memory. The description in this paragraph is also applicable to other processing units such as 1402 and 1502 and other communications units such as 1401 and 1503.

Figure 13:
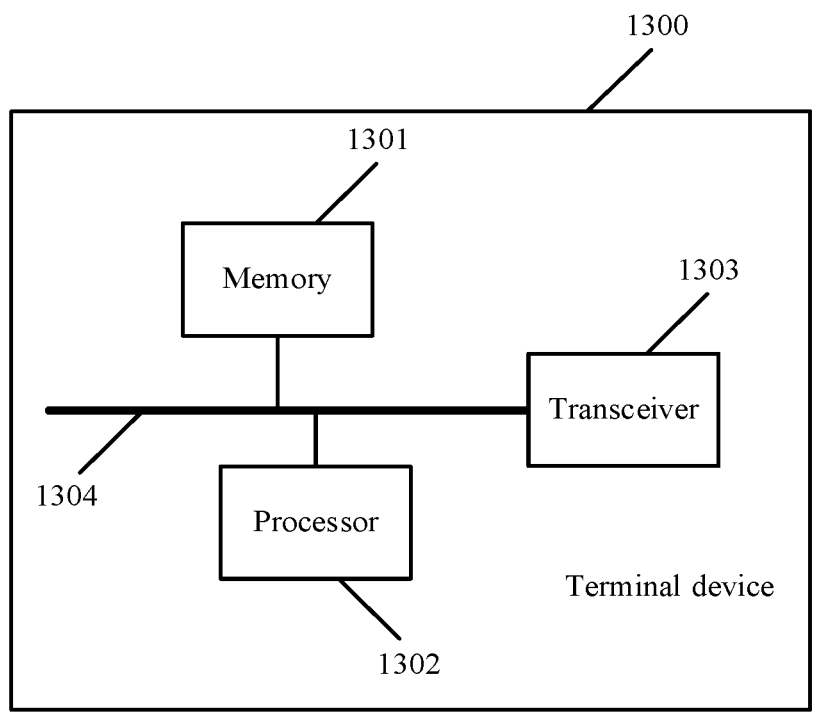
FIG. 13 is a schematic structural diagram of still another terminal device according to an embodiment of the present disclosure.

As shown in FIG. 13, in another embodiment, the terminal device 1300 may include a processor 1302, a transceiver 1303, and a memory 1301. The transceiver 1303, the processor 1302, and the memory 1301 are connected to each other. The processor may perform a function of the foregoing processing unit 1202, the transceiver may have a function similar to that of the foregoing communications unit 1203, and the memory may have a function similar to that of the foregoing storage unit 1201. The transceiver 1303 may include a receiver and a transmitter, or may be obtained by integrating a receiver and a transmitter. This is not limited in this application. Optionally, the terminal device 1300 may further include a bus 1304, and the bus 1304 may be a peripheral component interconnect (PCI for short) bus, an extended industry standard architecture (EISA for short) bus, or the like. The bus may be classified into an address bus, a data bus, a control bus, and the like. For ease of representation, only one thick line is used to represent the bus in FIG. 13, but this does not mean that there is only one bus or only one type of bus.

It should be understood that, in this application, the units (the communications unit, the processing unit, and the like) or components (the transceiver, the processor, and the like) in the foregoing terminal devices may be combined to implement the steps or behavior of the terminal devices in some or all of the embodiments of this application. Alternatively, the units or components may separately perform the steps or behavior of the terminal device in any embodiment of this application, for example, the steps or behavior of the terminal devices in the embodiments shown in FIG. 3 to FIG. 8; or separately implement the steps or behavior of the terminal device in the embodiment shown in FIG. 10, and so on. This is not limited in this application.

Method or algorithm steps described in combination with the content disclosed in this application may be implemented by hardware, or may be implemented by a processor by executing a software instruction. The software instruction may include a corresponding software module. The software module may be stored in a random access memory (RAM for short), a flash memory, a read-only memory (ROM for short), an erasable programmable read only memory (EPROM for short), an electrically erasable programmable read only memory (EEPROM for short), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in the terminal device. Certainly, the processor and the storage medium may exist in the terminal device as discrete components.

Figure 14:
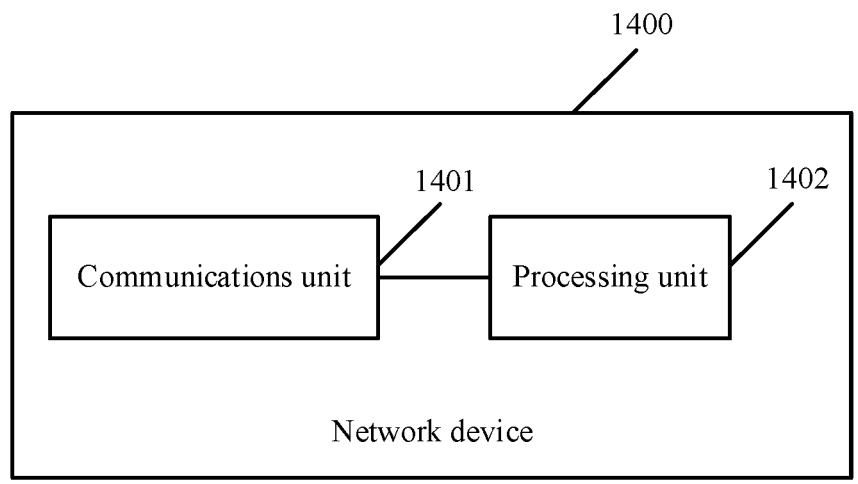
FIG. 14 is a schematic structural diagram of a network device according to an embodiment of the present disclosure.

FIG. 14 is a possible schematic structural diagram of a network device in the foregoing embodiments. As shown in FIG. 14, the network device 1400 may include a communications unit 1401 and a processing unit 1402. These units may perform corresponding functions of the network device in the foregoing method examples. For example, the communications unit 1401 is configured to obtain time domain requirement information of data transmission performed by a terminal device, where the time domain requirement information includes at least one of time adjustment information, jitter time information, time domain resource information, latest sending time information, and remaining duration of the data transmission, the time adjustment information is used to indicate allocation of a resource for the data transmission, the jitter time information is used to indicate a time range in which the data is generated, the time domain resource information is used to indicate a sending time of the data, and the latest sending time information and/or the remaining duration is used to indicate a latest sending time of the data; and the processing unit 1402 is configured to allocate a resource for transmitting the data, to the terminal device based on the time domain requirement information.

Optionally, the communications unit 1401 may be specifically configured to receive the time domain requirement information sent by the terminal device.

Optionally, the communications unit 1401 may be specifically configured to obtain, from a core network entity or a network management system, the time domain requirement information of the data transmission performed by the terminal device.

Optionally, the processing unit 1402 may be specifically configured to allocate a resource group for transmitting the data, to the terminal device based on the time domain requirement information, where the resource group includes at least three resources, and interval time lengths of the at least three resources are different.

Optionally, interval time lengths of any two adjacent resources in the at least three resources are different, and the closer to the latest sending time of the data, the shorter an interval time length of adjacent resources in the at least three resources is.

Optionally, the time domain requirement information includes the time adjustment information.

The processing unit 1402 may be specifically configured to invoke the communications unit 1401 to send an acknowledgment message to the terminal device for the time adjustment information, where the acknowledgment message is used to instruct the terminal device to transmit the data by using the resource indicated by the time adjustment information.

Optionally, the allocation includes adjustment of an allocated resource for the data, the time domain requirement information further includes channel information, and the channel information is used to indicate a channel associated with the allocated resource.

Optionally, the allocation includes adjustment of an allocated resource for the data, the allocated resource includes at least one group of resources, the time domain requirement information further includes a resource identifier, and the resource identifier is used to indicate a resource, in the at least one group of resources, whose resource position needs to be adjusted.

The communications unit 1401 may be configured to send, to the terminal device, information about the resource for the data transmission.

The communications unit 1401 may be further configured to send timer information. Therefore, the terminal device can determine the resource for the data transmission based on the information about the resource for the data transmission; determine a timer value based on the timer information; and start a timer when a timer start condition is met, and prohibit using the resource for the data transmission to send data within a duration range corresponding to the timer value.

In a possible design, the timer information may include one or more of: information used to indicate one or more timer values, a quantity of repetition times of a pre-allocated resource, that is, the allocated resource, a period of the allocated resource, and the like.

In a possible design, the information about the resource and/or the timer information may be sent by using higher layer signaling, or may be sent by using physical layer signaling. This is not limited in this application.

In a possible design, the timer information may include different air interface formats and timer values corresponding to the air interface formats.

In a possible design, the timer information may include a value, and the value may be used as a reference value in different air interface formats.

In a possible design, the timer information may include information about different BWPs and timer values corresponding to the BWPs.

In a possible design, the timer information may include different air interface formats and different values corresponding to the air interface formats.

In a possible design, the timer information may include different BWPs and different values corresponding to the BWPs.

It should be noted that, in this embodiment of the present invention, unit division is an example, and is merely logical function division. In actual implementation, another division manner may be used. Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

Figure 15:
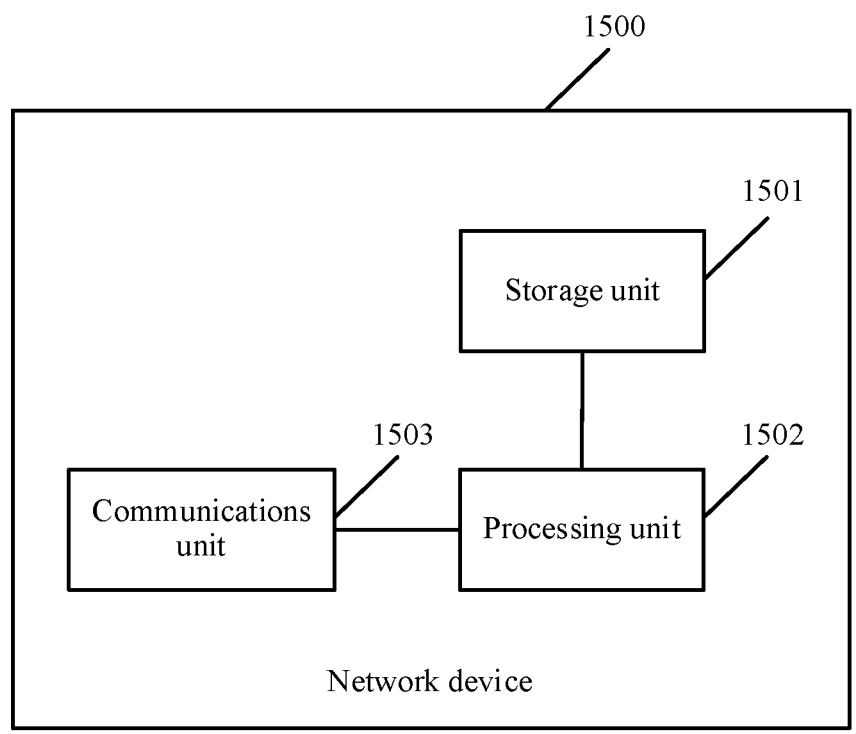
FIG. 15 is a schematic structural diagram of another network device according to an embodiment of the present disclosure.

When an integrated unit is used, FIG. 15 is another possible schematic structural diagram of a network device in the foregoing embodiments. As shown in FIG. 15, the network device 1500 may include a processing unit 1502 and a communications unit 1503. The processing unit 1502 may be configured to control and manage an action of the network device. For example, the processing unit 1502 is configured to support the network device in performing the process 402 in FIG. 4, the process 603 in FIG. 6, the process 802 in FIG. 8, and/or another process of the technology described in this specification. The communications unit 1503 is configured to support the network device in communicating with another network entity, for example, communicating with a network entity such as the terminal device shown in FIG. 3 to FIG. 8. For example, the communications unit 1503 is configured to support the network device in performing the process 503 in FIG. 5, the process 604 in FIG. 6, the process 803 in FIG. 8, and the processes 1001 and 1003 and the like in FIG. 10. The network device may further include a storage unit 1501, configured to store program code and data of the network device.

The processing unit 1502 may be a processor or a controller, such as may be a CPU, a general purpose processor, a DSP, an ASIC, an FPGA or another programmable logic device, a transistor logic device, or a hardware component, or any combination thereof. The processor may implement or execute various example logical blocks, modules, and circuits described with reference to content disclosed in this application. Alternatively, the processor may be a combination implementing a computing function, for example, a combination of one or more microprocessors, or a combination of a DSP and a microprocessor. The communications unit 1503 may be a transceiver. The storage unit 1501 may be a memory.

Figure 16:
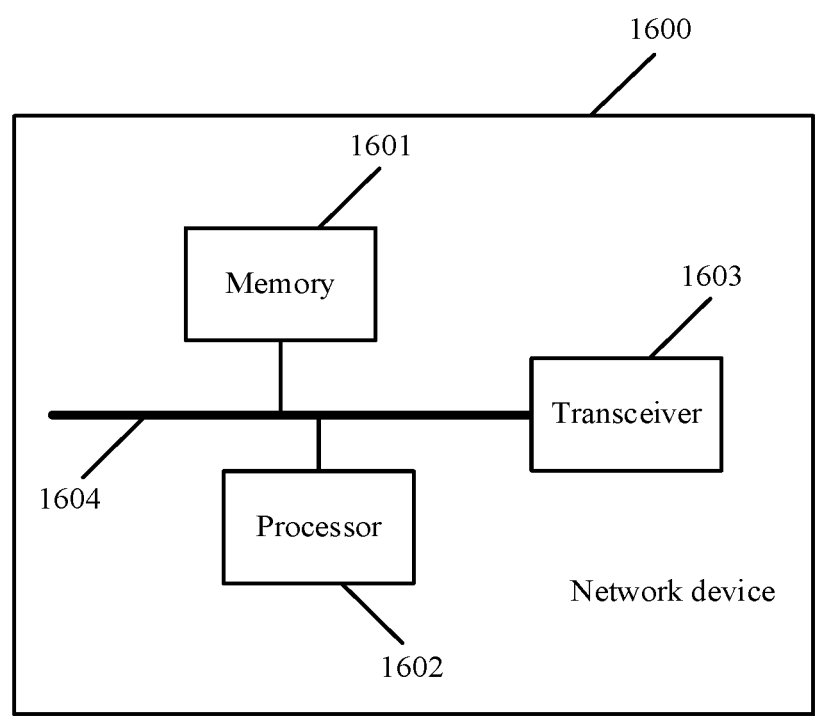
FIG. 16 is a schematic structural diagram of still another network device according to an embodiment of the present disclosure.

As shown in FIG. 16, in another embodiment, a network device 1600 may include a processor 1602, a transceiver 1603, and a memory 1601. The transceiver 1603, the processor 1602, and the memory 1601 are connected to each other. The processor may perform a function of the foregoing processing unit 1502, the transceiver may have a function similar to that of the foregoing communications unit 1503, and the memory may have a function similar to that of the foregoing storage unit 1501. The transceiver 1603 may include a receiver and a transmitter, or may be obtained by integrating a receiver and a transmitter. This is not limited in this application. Optionally, the network device 1600 may further include a bus 1604, and the bus 1604 may be a PCI bus, an EISA bus, or the like. The bus may be classified into an address bus, a data bus, a control bus, and the like. For ease of representation, only one thick line is used to represent the bus in FIG. 16, but this does not mean that there is only one bus or only one type of bus.

It should be understood that, in this application, the units (the communications unit, the processing unit, and the like) or components (the transceiver, the processor, and the like) in the foregoing network devices may be combined to implement the steps or behavior of the network devices in some or all of the embodiments of this application. Alternatively, the units or components may separately perform the steps or behavior of the network device in any embodiment of this application, for example, the steps or behavior of the network device in the embodiments shown in FIG. 3 to FIG. 8; or separately implement the steps or behavior of the network device in the embodiment shown in FIG. 10, and so on. This is not limited in this application.

Method or algorithm steps described in combination with the content disclosed in this application may be implemented by hardware, or may be implemented by a processor by executing a software instruction. The software instruction may include a corresponding software module. The software module may be stored in a RAM, a flash memory, a ROM, an EPROM, an EEPROM, a register, a hard disk, a removable hard disk, a compact disc read-only memory, or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in the network device. Certainly, the processor and the storage medium may exist in network device as discrete components.

In an implementation process, steps in the foregoing methods can be implemented by using a hardware integrated logical circuit in the processor, or by using instructions in a form of software. The steps of the methods disclosed with reference to the embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should further be understood that the "first", "second", "third", and "fourth" and various digital numbers in this specification are merely for differentiation for ease of description, and are not intended to limit the scope of the embodiments of the present invention.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of the present invention.

A person of ordinary skill in the art may be aware that, in combination with illustrative logical blocks (illustrative logical block) described in the embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions of each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

All or some of the foregoing embodiments may be implemented by using software, hardware, firmware, or any combination thereof. When software is used for implementation, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

What is claimed is:

1. An information indication method, comprising:
   determining, by a terminal device, time domain requirement information of data transmission, wherein the time domain requirement information comprises at least one of time adjustment information, jitter time information, time domain resource information, latest sending time information, and remaining duration of the data transmission, wherein the time adjustment information indicates allocation of a resource for the data transmission, the jitter time information indicates a time range in which data is generated, the time domain resource information indicates a sending time of the data, and the latest sending time information and/or the remaining duration indicates a latest sending time of the data;
   sending, by the terminal device, the time domain requirement information to a network device; and
   receiving, by the terminal device, an allocated resource for data transmission from the network device in accordance with the time domain requirement information, wherein the allocated resource comprises a resource group that comprises one or more resources, and the one or more resources have different interval time lengths.

2. The method according to claim 1, wherein the time domain requirement information further comprises channel information, and the channel information indicates a channel associated with the allocated resource.

3. The method according to claim 1, wherein the allocated resource comprises at least one resource group of resources, the time domain requirement information further comprises a resource identifier, and the resource identifier indicates a resource, in the at least one resource group of resources, whose resource position needs to be adjusted.

4. The method according to claim 1, wherein the sending, by the terminal device, the time domain requirement information to a network device comprises:
   sending, by the terminal device, the time domain requirement information to the network device when a difference between a generation time of the data and a time of an allocated resource that can be used to send the data after the data is generated exceeds a preset threshold.

5. The method according to claim 1, wherein if the time domain requirement information comprises the time adjustment information, the method further comprises:
   receiving, by the terminal device, an acknowledgment message sent by the network device; and
   transmitting, by the terminal device, the data by using the resource indicated by the time adjustment information.

6. An information indication method, comprising:
   obtaining, by a network device, time domain requirement information of data to-be-transmitted by a terminal device, wherein the time domain requirement information comprises at least one of time adjustment information, jitter time information, time domain resource information, latest sending time information, and remaining duration of the data transmission, the time adjustment information indicates allocation of a resource for the data transmission, the jitter time information indicates a time range in which data is generated, the time domain resource information indicates a sending time of the data, and the latest sending time information and/or the remaining duration indicates a latest sending time of the data; and
   allocating, by the network device, a resource for transmitting the data, to the terminal device based on the time domain requirement information, wherein the resource comprises a resource group that comprises one or more resources and the one or more resources have different interval time lengths.

7. The method according to claim 6, wherein the obtaining, by a network device, time domain requirement information of data to be transmitted by a terminal device comprises:
receiving, by the network device, the time domain requirement information sent by the terminal device.

8. The method according to claim 6, wherein the obtaining, by a network device, time domain requirement information of data to be transmitted by a terminal device comprises:
obtaining, by the network device from a core network entity or a network management system, the time domain requirement information of the data.

9. The method according to claim 6,
wherein the resource group comprises at least three resources, and interval time lengths of the at least three resources are different.

10. The method according to claim 9, wherein the closer to the latest sending time of the data, the shorter an interval time length of adjacent resources in the at least three resources is.

11. The method according to claim 6, wherein the time domain requirement information comprises the time adjustment information; and the allocating, by the network device, a resource for transmitting the data to the terminal device based on the time domain requirement information comprises:
sending, by the network device, an acknowledgment message to the terminal device for the time adjustment information, wherein the acknowledgment message instructs the terminal device to transmit the data by using the resource indicated by the time adjustment information.

12. The method according to claim 6, wherein the allocation comprises adjustment of an allocated resource for the data, the time domain requirement information further comprises channel information, and the channel information indicates a channel associated with the allocated resource.

13. The method according to claim 6, wherein the allocation comprises adjustment of an allocated resource for the data, the allocated resource comprises at least one group of resources, the time domain requirement information further comprises a resource identifier, and the resource identifier is used to indicate a resource, in the at least one group of resources, whose resource position needs to be adjusted.

14. A terminal device, comprising a processor and a communications unit, wherein
the processor is configured to determine time domain requirement information of data transmission, wherein the time domain requirement information comprises at least one of time adjustment information, jitter time information, time domain resource information, latest sending time information, and remaining duration of the data transmission, the time adjustment information indicates allocation of a resource for the data transmission, the jitter time information indicates a time range in which data is generated, the time domain resource information indicates a sending time of the data, and the latest sending time information and/or the remaining duration indicates a latest sending time of the data; and
the communications unit is configured to send the time domain requirement information to a network device and to receive an allocated resource from the network device, wherein the allocated resource comprises a resource group that comprises one or more resources, and the one or more resources have different interval time lengths.

15. The terminal device according to claim 14, wherein the time domain requirement information further comprises channel information, and the channel information indicates a channel associated with the allocated resource.

16. The terminal device according to claim 14, wherein the allocated resource comprises at least one resource group of resources, the time domain requirement information further comprises a resource identifier, and the resource identifier indicates a resource, in the at least one resource group of resources, whose resource position needs to be adjusted.

17. The terminal device according to claim 14, wherein
the communications unit is configured to send the time domain requirement information to the network device when a difference between a generation time of the data and a time of an allocated resource that can be used to send the data after the data is generated exceeds a preset threshold.

18. The terminal device according to claim 14, wherein if the time domain requirement information comprises the time adjustment information,
the communications unit is further configured to: receive an acknowledgment message sent by the network device, and transmit the data by using the allocated resource.

19. A network device, comprising a processor and a transceiver, wherein
the transceiver is configured to obtain time domain requirement information of data to be transmitted by a terminal device, wherein the time domain requirement information comprises at least one of time adjustment information, jitter time information, time domain resource information, latest sending time information, and remaining duration of data transmission, the time adjustment information indicates allocation of a resource for the data transmission, the jitter time information indicates a time range in which data is generated, the time domain resource information indicates a sending time of the data, and the latest sending time information and/or the remaining duration indicates a latest sending time of the data; and
the processor is configured to allocate a resource for transmitting the data by the terminal device, to the terminal device based on the time domain requirement information, wherein the allocated resource comprises a resource group that comprises one or more resources and the one or more resources have different interval time lengths.

20. The network device according to claim 19, wherein the time domain requirement information further comprises channel information, and the channel information indicates a channel associated with the allocated resource.

21. The network device according to claim 19, wherein the allocated resource comprises at least one resource group of resources, the time domain requirement information further comprises a resource identifier, and the resource identifier indicates a resource, in the at least one resource group of resources, whose resource position needs to be adjusted.

22. The network device according to claim 19, wherein
the transceiver is configured to receive the time domain requirement information from the terminal device when a difference between a generation time of the data and a time of an allocated resource that can be used to send the data after the data is generated exceeds a preset threshold.

23. The network device according to claim 19, wherein if the time domain requirement information comprises the time adjustment information, the transceiver is further configured to: send an acknowledgment message to the terminal device for the time adjustment information, wherein the acknowledgment message instructs the terminal device to transmit the data by using the resource indicated by the time adjustment information.

* * * * *